US011049049B2

(12) United States Patent
Junker et al.

(10) Patent No.: US 11,049,049 B2
(45) Date of Patent: *Jun. 29, 2021

(54) TRANSFORMING RULES INTO GENERALIZED RULES IN A RULE MANAGEMENT SYSTEM

(71) Applicant: INTERNATIONAL BUSINESS MACHINES CORPORATION, Armonk, NY (US)

(72) Inventors: Ulrich Junker, Biot (FR); Thierry Kormann, Valbonne (FR)

(73) Assignee: International Business Machines Corporation, Armonk, NY (US)

( * ) Notice: Subject to any disclaimer, the term of this patent is extended or adjusted under 35 U.S.C. 154(b) by 934 days.

This patent is subject to a terminal disclaimer.

(21) Appl. No.: 15/728,493

(22) Filed: Oct. 9, 2017

(65) Prior Publication Data

US 2018/0032927 A1    Feb. 1, 2018

Related U.S. Application Data

(63) Continuation of application No. 14/501,602, filed on Sep. 30, 2014, now Pat. No. 9,824,316.

(30) Foreign Application Priority Data

Dec. 18, 2013 (GB) ..................................... 1322440

(51) Int. Cl.
　　*G06Q 10/06*　　(2012.01)
　　*G06N 5/02*　　(2006.01)
　　*G06F 16/00*　　(2019.01)

(52) U.S. Cl.
　　CPC ........... *G06Q 10/063* (2013.01); *G06F 16/00* (2019.01); *G06N 5/02* (2013.01); *G06N 5/025* (2013.01)

(58) Field of Classification Search
　　None
　　See application file for complete search history.

(56) References Cited

U.S. PATENT DOCUMENTS 5,473,732 A    12/1995    Chang et al.
6,236,978 B1    5/2001    Tuzhilin et al.
(Continued)

FOREIGN PATENT DOCUMENTS

TW    20120145170    10/2013

OTHER PUBLICATIONS

Webb et al, "On Detecting Differences Between Groups", KDD '03 Proceedings of the Ninth ACM SIGKDD international conference on Knowledge discovery and data mining, pp. 256-265, copyright 2003, 10 pages.

(Continued)

*Primary Examiner* — Vincent Gonzales
(74) *Attorney, Agent, or Firm* — Michael O'Keefe

(57) ABSTRACT

An original set of rules are transformed into a resulting set of generalized rules in a rule management system. An original set of rules stored in a data structure for transforming into a resulting set of rules are accessed. The original set of rules is automatically processed by building a compact description of one or more rules in the original set of rules and their actions in the form of logical constraints and solving constraints to find a solution that represents a case and an applied action, building a family of cases by taking all logical tests or their negation that are satisfied by the solution, and generalizing the family of cases by removal of specific logical tests which do not apply to the action, resulting in a most-general rule.

20 Claims, 13 Drawing Sheets

(56) References Cited

U.S. PATENT DOCUMENTS

| | | | |
|---|---|---|---|
| 7,152,075 | B2 | 12/2006 | Vining et al. |
| 7,337,230 | B2 * | 2/2008 | Zehavi .................... G06F 17/10 370/252 |
| 7,565,642 | B2 | 7/2009 | Moore |
| 7,587,379 | B2 | 9/2009 | Huelsman et al. |
| 7,603,331 | B2 | 10/2009 | Tuzhilin et al. |
| 8,042,167 | B2 | 10/2011 | Fulp et al. |
| 8,155,949 | B1 | 4/2012 | Rubin |
| 8,478,707 | B1 | 7/2013 | Ong et al. |
| 8,494,997 | B2 | 7/2013 | Bellamy, III et al. |
| 8,510,178 | B2 | 8/2013 | Kumar et al. |
| 9,715,664 | B2 | 7/2017 | Junker |
| 9,824,316 | B2 | 11/2017 | Junker et al. |
| 2006/0212412 | A1 | 9/2006 | Sapir |
| 2006/0277601 | A1 | 12/2006 | Gouda et al. |
| 2010/0161526 | A1 | 6/2010 | Zhang et al. |
| 2012/0158628 | A1 | 6/2012 | Junker et al. |
| 2012/0265789 | A1 | 10/2012 | Tuzhilin et al. |
| 2012/0330779 | A1 | 12/2012 | Tuzhilin et al. |
| 2013/0033723 | A1 | 2/2013 | Lombardo et al. |
| 2013/0085977 | A1 | 4/2013 | Junker et al. |
| 2013/0166483 | A1 | 6/2013 | Junker et al. |
| 2013/0166491 | A1 | 6/2013 | Zhang et al. |

OTHER PUBLICATIONS

Marinica, C, "Knowledge-Based Interactive Postmining of Association Rules Using Ontologies", Knowledge and Data Engineering, IEEE Transactions on vol. 22, Issue 6, published Jun. 2010, pp. 784-797, 14 pages.
Rule Compressor, Open Rules, accessed from the internet at <http://openrules.com/rulecompressor.htm> as of Sep. 9, 2014, 3 pages.
Rule Learner, Open Rules, accessed from the internet at <http://openrules.com/rulelearner.htm> as of Sep. 9, 2014, 4 pages.
Junker et al, QuickXPlain: Preferred Explanations and Relaxations for Over-Constrained Problems, Proceedings of AAAI 2004, accessed from the internet at <http://www.aaai.org/Library/AAAI/2004/aaai04-027.php> as of Sep. 9, 2014, 1 page.
Mitchell et al, "Explanation-Based Generalization: A Unifying View, Machine Learning 1", copyright 1986 Kluwer Academic Publishers, pp. 47-80, 34 pages.
Ziarko et al, "A Method for Computing All Maximally General Rules in Attribute-Value Systems," published in Computational Intelligence: an International Journal, vol. 12, No. 2, 1996, pp. 223-234, 15 pages.
Mitchell, Tom M., "Generalization as Search," published in the Artificial Intelligence Journal 18 (1982) 203-226. Artificial Intelligence, vol. 18, No. 2, 1982, pp. 203-226; Also appears in Readings in Artificial Intelligence, Webber and Nilsson (eds.), Tioga Press, 1981, pp. 517-542.
Buntine et al, "Generalized Subsumption and Its Applications to Induction and Redundancy", Artificial Intelligence Journal 36(2) (1988), pp. 149-176.
Russell et al, "Knowledge in Learning", Artificial Intelligence. A Modern Approach, Third Edition, 2010, accessed online at <http://www.csupomona.edu/~kding/materials/Artificial%20Intelligence%20A%20Modern%20Approach%203rd.pdf>, 1151 pages, Chapter 19, p. 774.
A. Preece, "A new approach to detecting missing knowledge in expert system rule base", Int. J. Man-Machine Studies, vol. 38, pp. 661-88, 28 pages, 1993.
W. Cohen, "Fast Effective Rule Induction", Mach. Learn: Proc. of the 12th Int'l Conf., 1995, 9 pages.
Office Action, dated Feb. 9, 2017, U.S. Appl. No. 14/501,602, filed Sep. 30, 2014, In re Junker, 56 pages.
Final Office Action, dated Jun. 21, 2017, U.S. Appl. No. 14/501,602, filed Sep. 30, 2014, In re Junker, 30 pages.
Notice of Allowance, dated Jul. 11, 2017, U.S. Appl. No. 14/501,602, filed Sep. 30, 2014, In re Junker, 24 pages.
"List of IBM Patents or Patent Applications Treated as Related", dated Aug. 20, 2019, 2 pages.

* cited by examiner

| | Age | Value | Category |
|---|---|---|---|
| g1 | [0; 10) | [0; 20) | Gold |
| g2 | [0; 20) | [10; 30) | Gold |
| g3 | [10; 30) | [0; 10) | Gold |
| g4 | [10; 20) | [10; 20) | Gold |
| g5 | [20; 30) | [10; 30) | Gold |

|     | Age | Value | Category |
|-----|-----|-------|----------|
| s1  | < 10 | < 10 | Silver |
| g1  | < 10 | [30; 50) | Gold |
| s2  | [10; 20) | < 10 | Silver |
| g2  | [10; 40) | [30; 40) | Gold |
| g3  | [10; 50) | [40; 50) | Gold |
| s3  | < 20 | [10; 20) | Silver |
| g4  | [20; 30) | < 20 | Gold |
| g5  | < 30 | [20; 30) | Gold |
| g6  | [30; 40) | [10; 30) | Gold |
| g7  | [30; 50) | < 10 | Gold |
| g8  | [40; 50) | [10; 40) | Gold |

*FIG. 2A*

|  | Age | Value | Category |
|---|---|---|---|
| ms1 | < 20 | < 20 | Silver |
| mg1 | [20; 50) | < 50 | Gold |
| mg2 | < 50 | [20; 50) | Gold |

*FIG. 2D*

TRANSFORMING RULES INTO GENERALIZED RULES IN A RULE MANAGEMENT SYSTEM

CROSS REFERENCE TO RELATED APPLICATIONS

This application is a continuation of commonly assigned U.S. patent application Ser. No. 14/501,602, filed Sep. 30, 2014, which claims priority under 35 U.S.C. § 119 from United Kingdom Patent Application No. 1322440.7, filed Dec. 18, 2013, the entire contents of each of which are hereby incorporated herein by reference.

TECHNICAL FIELD

This invention relates to the field of business rule management systems and transforming rules. In particular, the invention relates to transforming rules into generalized rules in a rule management system.

BACKGROUND

Business rules technology, for example, International Business Machine Corporation's Operational Decision Manager software product (ODM), provide a software development environment, along with dedicated, business user interfaces, for automating and governing frequently occurring, repeatable business decisions across processes and applications. The business rules technology delivers the ability to centrally manage the business rules that determine the day-to-day automated decisions that are made in an organization's applications and processes. Business rules technology supports decision automation inside business processes, mobile applications and cloud environments Business rule management systems allow analysts to carry out collaborative rule authoring and provide easy-to-use decision table editors. Analysts are now able to adapt policies very easily: copying rows, changing cell ranges, adding columns, etc. They are able to enter decision tables quickly with arbitrary cell ranges.

This causes the problem that the sizes of the tables may grow very quickly. Due to the changes, rules are getting more and more fragmented. Tables become difficult to understand, to manage, and require more time to execute.

There are customers that have projects with ten or hundred thousands of rules represented in the form of decision tables. It is well known in the field of business rule management that the number of the rules grows easily and can result in slow processing of decision rules.

Large numbers of rules are difficult to manage, to consolidate, and to execute. Large rule sets constitute a true problem for customers as far as rule management and execution is concerned and may also be considered a major obstacle in making rule management systems more pervasive.

If there are more than 20 attributes over a binary domain, then there will be over 1 million of cases within the rules. Similarly, if the cases involve more than two attributes over a numeric range from 1 to 1000 or more, there will be over 1 million of cases. This illustrates that the number of cases involved in a set of rules is prohibitive to non-automated processing.

A solution is therefore required to compress decision tables without changing their semantics.

Rules define which action to take dependent on the characteristics of a given case, which can have hundreds or thousands of attribute values that potentially influence the action. A rule is more general than another rule of same action if it is applicable to more cases than the other rule and it is more specific than the other rule if it is applicable to fewer cases. Conditions of specific rules will consist of many logical tests, whereas conditions of general rules will consist of a few logical tests. General rules thus are more concise and correspond to a potentially exponential number of specific rules as those specific rules detail all combinations of values for those attributes that the general rule leaves unconstrained.

Although a small number of concise general rules are more desirable than a potentially exponential number of specific rules, it is easier to understand, to write, to organize and to adapt specific rules. For example, organizing rules by geography, topics, and validity periods may lead to a large number of specific rules having similar patterns.

However, the number of specific rules grows exponentially in the number of attributes of the cases. For this reason, even simple rule languages permit more abstract forms of rule conditions by omitting tests for irrelevant attributes, by using wildcards in symbolic values, and by using intervals for regrouping multiple numeric values. The resulting rules permit a reduction of the overall number of rules but are difficult to identify.

Data mining systems automatically generate rules from historical data and are usually able to identify relevant attributes and to introduce abstract forms of rule conditions. However, data mining tools usually generate a huge number of candidate rules and use numeric indicators to select the interesting rules among the candidates. These indicators usually provide poor guidance for selecting rules, meaning that the data mining system will nevertheless end up generating a large number of quite specific rules.

Rule management systems provide facilities for capturing, managing, and adapting relatively large numbers of specific rules. They provide tools for collaborative rule authoring, rule versioning, rule analysis, and rule execution. Whereas those systems are able to manage large sets of rules, they provide only limited support for reducing the number of rules and for avoiding the combinatorial explosion of specific rules.

Even the hierarchical grouping of rules in the form of decision tables does not reduce the number of the rules and is insufficient to prevent an exponential explosion of the number of rules.

Binary decision diagrams and their generalizations are able to represent certain forms of rule sets in a compact form even if this rule set consists of an exponential number of rules. Decision diagrams constitute a factored representation of rule conditions and allow a reduction of the number of rules if many rules with same action have common factors.

Other methods seek to reduce the set of rules. Rule management systems and data-mining systems are able to eliminate rules that are made redundant by the other rules. Whereas redundancy elimination is an important first step to reduce the number of rules, it is not able to merge non-redundant specific rules into more general rules.

Methods for rule set compression replace several specific rules by more general rules and are thus able to reduce the number of rules by modifying the existing rules. For example, pairwise merging of rows in decision tables replaces two similar rows by a single row if those rows have the same actions and agree in all, but one condition column and the disjunction of the two conditions in this column can be represented in the decision table. Other methods apply Karnaugh-map minimization to minimize the conditions of multiple rules of same actions, but ignore the semantics of rule conditions. For example, those methods are not able to merge conditions about interval membership.

Whereas the previous compression methods are exact as they reformulate a rule set into an equivalent rule set, methods based on inductive learning seek to replace specific rules by more general rules while allowing over- and under-generalization. Those compression methods first generate a training set, which consists of cases as well as the actions made by the specific rules for those cases. This training set is then passed to a rule learning module, which finds general rules. The learned rules not only cover the cases in the training set, but also similar cases. Over-generalization occurs if one of these additional cases was not treated by the original rules. Under-generalization occurs if the learned rules do not cover all the cases treated by the original rules. As a consequence, the resulting rule set is not equivalent to the original rule set, but only an approximation of it.

There are also deductive learning techniques that extract a general concept definition from a proof for a given property. Those explanation-based generalization methods cannot directly be applied to the problem of rule set compression. Moreover, there is no guarantee that explanation-based generalization produces a most-general rule as there may be multiple proofs for the given property and some proofs may lead to more general rules than others.

Therefore, there is a need in the art to address the aforementioned problems.

SUMMARY

According to one embodiment of the present invention there is provided a method for transforming an original set of rules into a resulting set of generalized rules in a rule management system. The method is directed to the computer providing an original set of rules stored in a data structure in memory for transforming into a resulting set of rules. The method is directed to the computer performing automated processing of the original set of rules by: the computer building a compact description of one or more rules in the original set of rules and their actions in the form of logical constraints and solving constraints to find a solution that represents a case and an applied action; the computer building a family of cases by taking all logical tests or their negation that are satisfied by the solution; the computer generalizing the family of cases by removal of specific logical tests which do not limit the applicability of the action, resulting in a most-general rule; and the computer adding the most-general rule to a resulting set of rules. The method is directed to the computer iterating the automated processing at least one or more times, wherein for iteration the step of building a compact description of one or more rules in the original set of rules and their actions excludes any rules in the original set of rules which are addressed by the resulting set of rules. The method is directed to the computer replacing the original set of rules stored in the data structure in the memory with an equivalent set of generalized rules set in the resulting set of rules for automated application by the rule management system, wherein the size of the resulting set of rules in the memory is smaller than the original set of rules, the original set of rules comprising at least two rules that are not possible to merge into a single rule because the at least two rules comprise a plurality of attributes that impose different tests on more than one of the plurality of attributes, the resulting set of rules comprising at least one most-general rule that is a logical equivalent of the at least two rules.

Generalizing the family of cases may include establishing an ordering of logical tests that prefers more general tests to more specific ones and applying a conflict minimizer for computing a preferred subset of relevant tests.

A most-general rule may treat at least one case that is treated by the original set of rules, but not yet by the resulting set of rules and wherein the most-general rule conforms to the original set of rules as it applies only actions to cases that are also applied by the original rules to those cases.

Building a family of cases may include usage of constraint-based models to compute a family of cases for the action which are treated by the original set of rules but not by already computed most-general rules. In one embodiment, building a family of cases may include: building a residual rule application constraint graph; solving constraints to find a solution and extracting a case and applied action; building a family of cases by taking all logical tests or their negation that are satisfied by the extracted case.

Generalizing the family of cases into a most-general rule may use explanation-based consistency techniques to identify relevant logical tests in the family description to generalize the family into a most-general rule. Generalizing the family of cases into a most-general rule may include: ordering the logical tests by decreasing generality; selecting all original rules having the action of the extracted case and building a rule inhibition graph for them; identifying a subset of relevant tests that characterizes a most-general family of cases for the given action by applying a conflict minimizer to the ordered tests as a foreground and the rule inhibition graph as background.

In one embodiment, a method may compress an original set of rules into an equivalent smaller resulting set of rules and may remove irrelevant logical tests from the original set of rules.

The original set of rules may be reconstructed in a target rule language and the method includes adapting the target rule language to customize the resulting set of rules.

According to one embodiment of the present invention there is provided a computer system for transforming an original set of rules into a resulting set of generalized rules in a rule management system. The computer system comprising one or more processors, one or more computer-readable memories and one or more computer-readable, tangible storage devices. The computer system comprising an original set of rules stored in a data structure on the one or more computer-readable memories for transforming into a resulting set of rules. The computer system comprising program instructions, stored on at least one of the one or more storage devices for execution by at least one of the one or more processors via at least one of the one or more memories, to automate rule processing, the program instructions to automate rule processing including: a residual case detector for building a compact description of one or more rules in the original set of rules and their actions in the form of logical constraints and solving constraints to find a solution that represents a case and an applied action, and building a family of cases by taking all logical tests or their negation that are satisfied by the solution; a treated case generalizer for the family of cases by removal of specific logical tests which do not limit the applicability of the action, resulting in a most-general rule; and, a controller operative for adding the most-general rule to the resulting set of rules. The computer system comprising program instructions, stored on at least one of the one or more storage devices for execution by at least one of the one or more processors via at least one of the one or more memories, to iterate the automated rule processing at least one or more times wherein for each iteration the residual case detector is further operative to build the compact description of the one or more rules in the original set of rules and the one or more actions excludes any rules in the original set of rules which are addressed by the resulting set of rules. The computer system comprising program instructions, stored on at least one of the one or more storage devices for execution by at least one of the one or more processors via at least one of the one or more memories, to replace the original set of rules stored in the data structure with an equivalent set of generalized rules set in the resulting set of rules for automated application by the rule management system, wherein the size of the resulting set of rules on the one or more computer-readable memories is smaller than the original set of rules, the original set of rules comprising at least two rules that are not possible to merge into a single rule because the at least two rules comprise a plurality of attributes that impose different tests on more than one of the plurality of attributes, the resulting set of rules comprising at least one most-general rule that is a logical equivalent of the at least two rules.

The treated case generalizer may include a preference governor for establishing an ordering of logical tests that prefers more general tests to more specific ones and passes this ordering to a conflict minimizer for computing a preferred subset of relevant tests.

The residual case detector may use constraint-based models to compute a family of cases, which are treated by the original set of rules but not by already computed most-general rules. The residual case detector may include: a rule set application modeler for building a residual rule application constraint graph; a logical constraint solver for solving constraints and for extracting a case and applied action; a treated case family builder for building a family of cases by taking all logical tests or their negation that are satisfied by the extracted case.

The treated case generalizer may use explanation-based consistency techniques to identify relevant logical tests in a family description to generalize the family into a most-general rule. The treated case generalizer may include: a preference governor for ordering the logical tests by decreasing generality; a rule set inhibition modeler for selecting all original rules having the action of the residual case and building a rule inhibition graph for them; a conflict minimizer for identifying a subset of relevant tests that characterizes a most-general family of cases for the given action by applying the conflict minimizer to the ordered tests as a foreground and the rule inhibition graph as background.

In one embodiment, a system may compress an original set of rules into an equivalent smaller resulting set of rules and removes irrelevant logical tests from the original set of rules.

The original set of rules may be reconstructed in a target rule language and the target rule language adapted to customize the resulting set of rules.

According to one embodiment of the present invention there is provided a computer program product for transforming an original set of rules into a resulting set of generalized rules in a rule management system, the computer program product comprising: a computer readable storage medium readable by a processing circuit and storing instructions for execution by the processing circuit for performing a method according to the first aspect of the present invention.

According to one embodiment of the present invention there is provided computer program stored on a computer readable medium and loadable into the internal memory of a digital computer, comprising software code portions, when said program is run on a computer, for performing the method of the first aspect of the present invention.

According to one embodiment of the present invention there is provided a method substantially as described with reference to the figures.

According to one embodiment of the present invention there is provided a system substantially as described with reference to the figures.

The described aspects of one embodiment of the invention provide for transforming each set of specific rules into an equivalent set of most-general rules with compression. In one embodiment, the described compression technique may be a way of rephrasing tests in a much more compact way. In one embodiment, the method may not only be applicable to decision tables, but to arbitrary sets of rules.

In one embodiment, a method may reduce the number of tests and thus both reduces the rule set size and improves the overall performance of rule execution. Decision tables in rule management systems may be reduced in size while maintaining the semantics for the rules, thereby improving overall performance of the rule management system.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which:

FIGS. 2A to 2D are a table and corresponding graphs showing original rules and synthesized rules in accordance with the present invention;

DETAILED DESCRIPTION

Figures 1A, 1B:
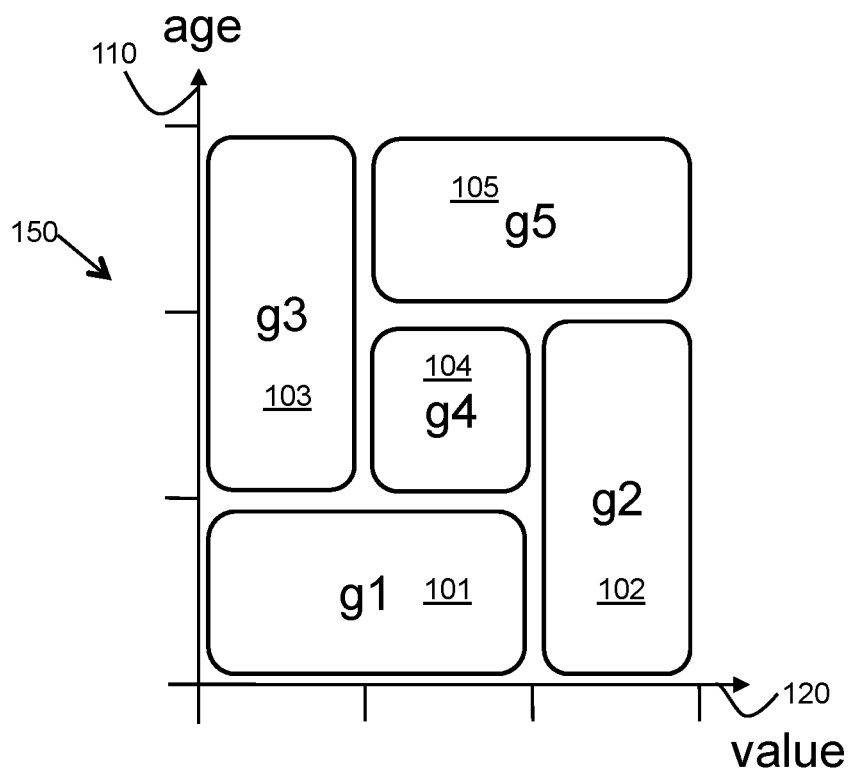
FIGS. 1A and 1B illustrate a table and corresponding graph showing rules to which a method in accordance with the present invention may be applied.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Rule management systems, for example, IBM's Operational Decision Manager (ODM) (IBM is a trade mark of International Business Machine Corporation), provide a development environment, along with dedicated, business user interfaces, for automating and governing frequently occurring, repeatable business decisions across processes and applications.

A rule management system generally includes two main components, which form a platform for managing and executing business rules. Firstly, a decision center provides an integrated repository and management components, allowing subject matter experts to maintain and govern their business decisions. This provides a repository and management component for the creation and maintenance of decision logic guiding the business system's behavior. It is the central hub for the coordination of the decision life cycle of business rules and allowing editing of those rules. Secondly, a decision server provides the runtime components to automate decision logic, enabling the detection of business situations and precise response based on the context of the interaction.

Sets of rules for use in a rule management system may be provided in decision tables or other forms of data structures stored in storage media and accessible by the rule management system. System users may add rules via a user interface of the rule management system and such rules are added to appropriate decision tables and stored for application by the decision logic.

A described system is provided for transforming an original set of rules provided in a rule management system in the form of decision tables or other data structures into a set of generalized rules. The generalized rules may form a compression of the original set of rules into a reduced number of rules without affecting the semantics of the original set of rules.

An iterative method and system are provided for transforming an original set of rules into an equivalent set of generalized rules. The term "most-general rule" is used herein to refer to a rule which generalizes one or more original rules without affecting the semantics of the rules and which cannot be generalized further in a chosen target rule language.

The term "most-general rule" is defined herein as a rule for which there does not exist any other rule that treats a proper superset of the cases treated by the first rule. Existence of a most-general rule may depend on a suitable definition of a rule language, as not all kinds of logical tests may be expressible in such a language. It is a strength of the described method and system that they are able to generate most-general rules for a given target rule language where rule conditions are conjunctions of logical tests.

In the field of machine learning, it is standard to define a generalization relation among rules. A seminal reference is the article "Generalization as Search" by Tom Mitchell as published in the Artificial Intelligence Journal 18 (1982) 203-226. A short resume of the definition is given in the article "Generalized Subsumption and Its Applications to Induction and Redundancy" by Wray Buntine, as published Artificial Intelligence Journal 36(2) (1988) 149-176. Buntine writes: "Briefly, rule R1 is more general than rule R2, or R2 is more specific than R1, if in any world R1 can be used to show at least the same results as R2 (adapted from Mitchell [. . . ])." In the currently used terminology, this means that whenever R2 is applicable then R1 must be applicable as well and result into the same action as R2. This generalization relation is a partial order, meaning that not all pairs of rules are comparable.

Machine learning is, among other things, concerned in finding rules expressible in a given rule language that are consistent with the examples in a given training set (i.e. produce the expected actions for those examples when applicable to them). Mitchell has introduced the concept of a version space to characterize those rules. Mitchell represents the version space in terms of the "most-general rules" among all rules of the rule language that are consistent with the training examples and the "most-specific rules" among all rules of the rule language that are consistent with the training examples. If a rule is at least as general as some of those "most-specific rules" and at least as specific as some of those "most-general rules" then it belongs to the version space. Hence, "most-general rules" and "most-specific rules" are an integral part of Mitchell's method for representing large version spaces in a compact way. It needs to be noted that there is more than one "most-general rule" and more than one "most-specific rule" as the generalization relation is a partial order. A good description of Mitchell's method is included in chapter 19 "Knowledge in Learning" of the book "Artificial Intelligence. A Modern Approach." Third Edition, 2010 by Stuart Russell and Peter Norvig. Page 774 gives a sketch of the version space characterized by a most-general boundary (consisting of the "most-general rules") and a most-specific boundary (consisting of the "most-specific rules").

It needs also be noted that terminology varies from author to author. Some authors use the term hypothesis for the rules to be learned. Mitchell himself speaks of generalizations. So the term "most-general rule" does not appear in his paper. He simply speaks of generalizations g for which there is no generalization which is both more general than g, and consistent with the training examples. Some patents are using the term "most-general rules" (e.g. US 2006/0212412 A1 "Methods and systems for induction and use of probabilistic patterns to support decisions under uncertainty"). Other authors speak of "maximally general rules for a target classification" (see the article "A Method for Computing All Maximally General Rules in Attribute-Value Systems." by Wojciech Ziarko, Ning Shan published in Computational Intelligence 1996).

Whereas machine learning seeks to generalize data into rules, rule compression seeks to transform original rules into more compact rules, but without changing the semantics of the original rules. Hence, any of the resulting rules must comply to the original rules in the following sense: Whenever any of the resulting rules is applicable then also some of the original rules needs to be applicable and the resulting rule needs to produce the same action as the original rule. In other terms, each resulting rule needs to be logically implied by the set of original rules. In the present disclosure, only the most-general rules are considered among all rules of a given rule language that are logically implied by the set of original rules. A rule is a most-general rule among all rules of the given rule language that are logically implied by the set of original rules if there is no other rule in the given rule language that is more general than the first rule and this second rule is also logically implied by the set of original rules. The described method does not compute all those most-general rules, but just a minimal set of most-general rules, which is logically equivalent to the set of original rules. Minimality means that equivalence will be lost if some rule is removed from the resulting set of rules.

The described method starts with the observation that a fully compressed rule set will consist of most-general rules only. So transforming a rule set into most-general rules is a necessary condition for full compression.

It is possible to transform the original rule set in different ways in terms of most-general rules, meaning that there are several sets of most-general rules that compress the original rules in different ways. So transforming an original rule set into most-general rules may leave the possibility for some choice of the resulting rule set.

The method uses constraint models to compute a family of cases that are treated by the original set of rules, but not by already computed generalized rules. Such cases are referred to as "residual cases" as they remain un-addressed or un-treated by the newly generated generalized rules. The method uses explanation-based consistency techniques to identify relevant logical tests in the family description and thus generalizes this family into a most-general resulting rule.

A method and system are provided that are able to transform an original set of rules into an equivalent set of generalized rules. The method completely reconstructs an original rule set in a target rule language by seeking combinations of relevant logical tests under which an action is applicable. It does not directly manipulate representations of the original rules, but just uses this original rule set to determine which actions are applied to which cases. The target rule language uses conjunctions of the logical tests of the original rules and their negations. The target rule language does not introduce complex rule conditions in form of disjunctions or conjunctions as those complex conditions are more adequately expressed as separate rules. In other words, the method synthesizes rules in this target rule language while respecting the behavior of the original rule set. The method works for condition-action rules (also called production rules), logical implications, and default rules.

The disclosed method iteratively constructs a set of generalized rules referred to as "a resulting rule set". In each iteration, it synthesizes a "most-general" rule and adds it to the resulting rule set. This most-general rule treats at least one case that is treated by the original rule set, but not yet by the resulting rule set. Furthermore, the most-general rule conforms to the original rule set as it applies only actions to cases that are also applied by the original rules to those cases. In order to find this most-general rule, the method builds a compact description of the cases treated by the original rule set and of their actions in the form of logical constraints. It furthermore builds a compact description of the cases that are not treated by the resulting rule set in form of constraints. The method employs constraint-solving techniques to find a solution of those logical constraints and extracts a case and its action from it. It then generalizes this treated case into a family of treated cases for this action.

The description refers throughout to "treating" a case. A case is treated if it is addressed by a rule resulting in an action, which means that the rule is applicable to the case (i.e. the case satisfies the condition of the rule).

This family of treated cases is described in terms of the logical tests of the target language. The method then explores several candidate subsets of those logical tests in order to identify a subset of relevant tests for the considered action. The method first orders the logical tests in decreasing order of generality. It then inspects one logical test after the other in the inverse ordering and removes the logical test from the candidate set if it is irrelevant for the considered action. A logical test is relevant for the considered action if its removal from a candidate set would make the family of treated cases described by the reduced candidate set too large. This means that the enlarged family includes a case that is not treated by the original rule set or the original rule set does not apply the considered action to this case, but another action. However, if the removal of a logical test does not include such a non-conforming case into the family then the logical test is irrelevant and can be removed. Once the method has identified all relevant logical tests the method is able to build a most-general rule for the considered action and the relevant logical tests. This rule generation is repeated until the original rule set has completely been reconstructed.

The method is thus able to compress a large set of specific rules into a smaller set of most-general rules. This compression not only reduces the size of the rule set, but also removes irrelevant logical tests from rules, thus allowing shorter and more concise representations of the resulting rules. If the original rule set is exponential in the number of attributes and all, but a few of those attributes are irrelevant, the method will compress this over-huge rule set into a small set of concise rules.

The purpose of the rules consists in making a decision for a given case. The case is described in terms of one or several objects of given types. Each type has a fixed number of attributes and each object has a value for each attribute of its type. Making the decision consists of applying an action to the objects. Technically, the action can consist of setting the value of an attribute of some of the given objects.

The described method does not work with given cases, but generates descriptions of cases that have certain properties (such as cases that are treated by the original rules, but not by the resulting rules). In order to generate a case that has the desired properties, the method builds a constraint graph where the constraints impose the desired properties. Such a constraint graph may have one or several solutions which are represented by graph labeling that respect the semantics of the graph nodes and that label the root node by "true". Each of these labellings corresponds to a case. By consulting the labeling, the objects of the case can be determined, as well as their types, and the values of the attribute of those objects. Furthermore, the action that is applied to the case can be consulted by inspecting the labeling of the node "the action".

Hence, a labeling of the constraint graph clearly defines a case and an action, but the description is not in an explicit form. It is possible to transform a graph labeling into a set of object-attribute-value triples, which describes the value of each attribute of each object. This transformation would be necessary if the case needed to be presented in a human-readable form.

However, the method does not work with those case descriptions, but with descriptions of whole families of cases. A family of cases is the set of cases that satisfy the atomic logical tests of the original rules in the same way. This means if some case in the family satisfies such a test, the other cases in the family also satisfy the test. And if some case in the family violates such a test, the other cases in the family also violate the test. Therefore, the method inspects each logical test occurring in the rule and selects the test if it is satisfied (i.e. labeled by "true" in the graph labeling) or the negation of the test if the test is violated (i.e. labeled by "false" in the graph labeling) in order to build a description of the family.

Although the disclosed method produces rules with most-general conditions, it does not guarantee that the resulting rule set is free of redundancy. Whereas a rule with most-general condition cannot be made (locally) redundant by a single rule, it can be made (globally) redundant by multiple other rules. Hence, the method eliminates local redundancies between pairs of rules in the original rule set, but it does not eliminate global redundancies between original rules. Indeed, the rule synthesis may, in certain cases, generate most-general rules that together make previously generated rules redundant. To address those issues, the disclosed method can be combined with a rule set minimization phase that eliminates all global redundancies among the synthesized rules. The result of this post-processing phase is a minimal set of most-general rules that has the same behavior as the original rule set.

The method may also be used as an exact data mining method. It is able to transform historical data about past cases and their actions into most-general rules without over-generalizing those rules. This extraction of most-general rules may produce meaningful results if the historical data is dense and actions had been applied in a coherent way.

The disclosed method is well able to compress multiple rules that all differ in more than one attribute and thus overcomes the limits of rule set compression through merging. Indeed, the method supports complex forms of compression as it reconstructs the rule set. Each original rule can contribute to multiple resulting rules and each resulting rule may cover multiple original rules.

The method may be customized by adaptions of the target rule language. For example, if the conditions of the original rules are described in form of equations between attributes and values from an ordered domain, then those equalities can be replaced by two inequations imposing the given value as lower bound and as upper bound for the attribute. Those inequations and their negations will then be included in the target language, thus permitting the creation of intervals in the condition of a synthesized rule.

Organizations such as financial institutes, insurances, sales organizations, government agencies have to treat a high volume of requests and to make decisions for those requests in a consistent way. Examples are decisions about acceptance and rejection of loans or insurance claims, decisions about discounts and so on. Organizations are not making those decisions on a case-by-case basis, but they make those decisions once for the whole population of possible cases. They decide which decision will be made for which case and they codify those generic decisions in form of rules. When processing a submitted case, the organization then simply applies the rules decided before. If a case satisfies the condition of a rule, then the rule is applicable to the case and able to treat this case. In order to make the decision for this case, it is then sufficient to apply that rule. Organizations are thus able to process high volumes of cases while guaranteeing that the same decision is made for equivalent cases. Hence, rules facilitate organizational decision-making as long as the number of rules is small compared to the number of cases.

A case description needs to contain sufficient information to make a decision. A case may have a structure and consist of multiple objects such as the different articles in a shopping cart as those articles may influence decisions about discounts. Each object is characterized by a fixed set of attributes of given types. There may be numerical attributes such as the customer age or the total value of a shopping cart and symbolic values such as the country and state of the customer. Complex cases may have hundred or thousands of attributes that may influence the decision-making. As a consequence, the space of all possible cases may be immense. Indeed, twenty attributes of Boolean type are sufficient to define one million cases. Similarly, two attributes ranging over the integers between 1 and 1000 are sufficient to define a space containing one million cases.

Rule-based decision-making will only be effective if the set of employed rules is complete, that means, the rules are treating all the possible cases. As a single rule is able to treat a large number of cases, a small number of well-chosen rules may be sufficient to cover a huge space of cases. However, it is a difficult task to configure such a rule set due to the combinatorial nature of the case space. It is easier to divide the case space into families of similar cases and to introduce a rule for each of these families. This rule will treat only the cases in its family and no other families.

An example is used to illustrate the described problem and the method and system proposed herein and is used throughout the description for reference. For example, a marketing organization may categories a customer as Silver, Gold, or Platinum depending on the geographic region, the age of the customer and the total value of items bought by the customer. The marketing department may organize rules by geographic region, thus introducing a large number of region-specific rules, although those rules follow similar patterns:

if the region of the customer is Alabama and
the age of the customer is at least 50 and
the value of the customer is at least 1000
then set the category of the customer to Platinum.
if the region of the customer is Alaska and
the age of the customer is at least 50 and
the value of the customer is at least 1000
then set the category of the customer to Platinum.
. . .
if the region of the customer is Wyoming and
the age of the customer is at least 50 and
the value of the customer is at least 1000
then set the category of the customer to Platinum.

If those rules impose the same restrictions on age and value for all regions without exception then those region-specific rules are equivalent to a region-independent rule:

if the age of the customer is at least 50 and
the value of the customer is at least 1000
then set the category of the customer to Platinum.

A first rule is more general than a second rule of same action if the first rule treats all the cases treated by the second rule and there is at least one case treated by the first rule, but not by the second rule. A first rule is more specific than a second rule of same action if the first rule treats only cases also treated by the second rule and there is at least one case not treated by the first rule, but by the second rule. Hence, if a first rule is more general than a second rule, then the second rule is more specific than the first rule and vice versa.

For example, the region-specific rules listed above are more specific than the region-independent rule, which is more general. Indeed, the region-specific rules distinguish the cases by their regions, which is not done by the more general rule. Specific rules thus make additional distinctions which increase the number of rules and which are encoded by additional tests in the rule condition. Imposing such additional distinctions can thus multiply the number of rules and increase the size of the representation of the rules in a rule language. For example, a set of region-independent rules will be multiplied by the number of regions if each region needs to have a region-specific copy of those rules. If those distinctions are introduced for several other attributes, then a combinatorial explosion of the number of rules with respect to the number of attributes is encountered. Moreover, the resulting rules will impose a test on each of those attributes, meaning that the rule representations get lengthy. So there is no interest in introducing additional distinctions by region or other criteria if rules are already in a general form.

Whereas a small number of concise general rules are more desirable than a potentially exponential number of specific rules, it is easier to understand, to write, to organize, and to adapt specific rules. Indeed, an organization may organize its rules from the beginning by geography, topics, and validity periods. A rule author may then fill in specific rules within these different categories without noticing similarities among those rules. Furthermore, a large number of specific rules may also be obtained as result of collaborative rule authoring where domain experts enter rules that are specific to particular domains. Finally, specific rules are a natural result of rule evolution. For example, a marketing organization may change its fidelity categorization for some customers. For example, it may increase the eligibility age for Platinum from 50 to 52, thus requiring a modification of the following rule:

action rule r1:
if the age of the customer is at least 50 and
the value of the customer is at least 1000
then set the category of the customer to Platinum.

The modification should ensure that Platinum is only assigned to customers older than 52 who bought items for a value of more than 1000. As a consequence, another category, such as Gold, needs to be chosen for customer aged between 50 and 52 who bought items for a value of more than 1000. Hence, the modification corresponds to splitting the rule r1 into two more specific rules r1a and r1b:

action rule r1a:
if the age of the customer is at least 52 and
the value of the customer is at least 1000
then set the category of the customer to Platinum
action rule r1b:
if the age of the customer is at least 50 and
the age of the customer is less than 52 and
the value of the customer is at least 1000
then set the category of the customer to Gold.

It may be possible to merge the second rule with some other rule. For example, there may be a rule r2 assigning Gold to customers between 30 and 50 who bought items for more than 1000:

action rule r2:
if the age of the customer is at least 30 and
the age of the customer is less than 50 and
the value of the customer is at least 1000
then set the category of the customer to Gold.

Merging the two rules r1b and r2 would thus result into a single rule r3, thus restoring the original number of rules:

action rule 3:
if the age of the customer is at least 30 and
the age of the customer is less than 52 and
the value of the customer is at least 1000
then set the category of the customer to Gold.

Hence, additional effort is necessary to consolidate a rule set after making a modification. This consolidation is not always that straightforward. Reducing the number of rules by pairwise merging only works if two rules impose the same tests on all, but one attribute. Furthermore, it must be possible to merge the tests on this attribute, that means, to represent the disjunction of those tests in the rule language. In the example, the first rule checks whether the age is in the interval [50, 52) and the second rule checks whether the age is in the interval [30, 50). The disjunction of these tests is equivalent of testing whether the age is in the interval [30, 52). As this merged test can be represented in the rule language, the rules could be merged. Hence, the merge was possible since the rule set contained another rule and the regions covered by both rules in the case space could be merged together to a regular region.

However, such a merge will not be possible in more complex scenarios. If a rule set is modified frequently, there is the risk that the rules in the set are split more and more. Rule evolution will therefore have a natural tendency of making the rules more and more specific and to increase the size of the rule set. Uncontrolled rule set modification may thus lead to rule sets of unmanageable size. Whereas the purpose of rules is to facilitate the processing of a huge volume of cases, a large number of rules may make this processing obscure, difficult to understand and to justify. It therefore appears to be important to consolidate the rule set after long sequences of modifications and to simplify it by reducing the number of rules.

FIGS. 1A and 1B show an example embodiment the problem addressed by the described method and system. FIGS. 1A and 1B show a decision table 100 and a corresponding graph 150 to illustrate a set of five rules g1 101, g2 102, g3 103, g4 104 and g5 105 that might have resulted from a sequence of rule modifications.

FIG. 1A shows a table 100 with columns for "Age" 110, "Value" 120, and "Category" 130. FIG. 1B shows a graph 150 of "Age" 110 against "Value" 120. All rules are assigning a Gold category to customers differing in age and the value of the items that they have bought:

Rule g1 101:
if the age of the customer is at least 0 and less than 10 and
the value of the customer is at least 0 and less than 20
then set the category of the customer to Gold
Rule g2 102:
if the age of the customer is at least 0 and less than 20 and
the value of the customer is at least 10 and less than 30
then set the category of the customer to Gold
Rule g3 103:
if the age of the customer is at least 10 and less than 30 and
the value of the customer is at least 0 and less than 10
then set the category of the customer to Gold
Rule g4 104:
if the age of the customer is at least 10 and less than 20 and
the value of the customer is at least 10 and less than 20
then set the category of the customer to Gold Rule g5 105:
if the age of the customer is at least 20 and less than 30 and
the value of the customer is at least 10 and less than 30
then set the category of the customer to Gold.

It is not possible to merge any of these rules since each pair of rules imposes different tests on more than one attribute. Nevertheless, the five rules are logically equivalent to a single rule:
if the age of the customer is at least 0 and less than 30 and
the value of the customer is at least 0 and less than 30
then set the category of the customer to Gold.

Hence, it is possible to simplify the rule set and to replace the specific rules by a more general rule. This requires the identification of large regions in the combinatorial case space for which the same decision is made.

The described method and system transform a set of specific rules into an equivalent set of most-general rules. It will be explained with respect to the rule set given in FIG. 2A.

FIG. 2A shows a decision table 200 consisting of eleven rows. Each row corresponds to a rule 201-211 deciding a customer category 240 depending on the customer age 220 and the value 230 of items bought by the customer. For some of the cases, the rules are choosing a Silver category. For the other cases, a Gold category is chosen. It is not possible to merge any of the rules as they all differ in more than one attribute. The decision table does not show any regularity or pattern allowing replacement those specific rules by more general rules.

Figure 2B:
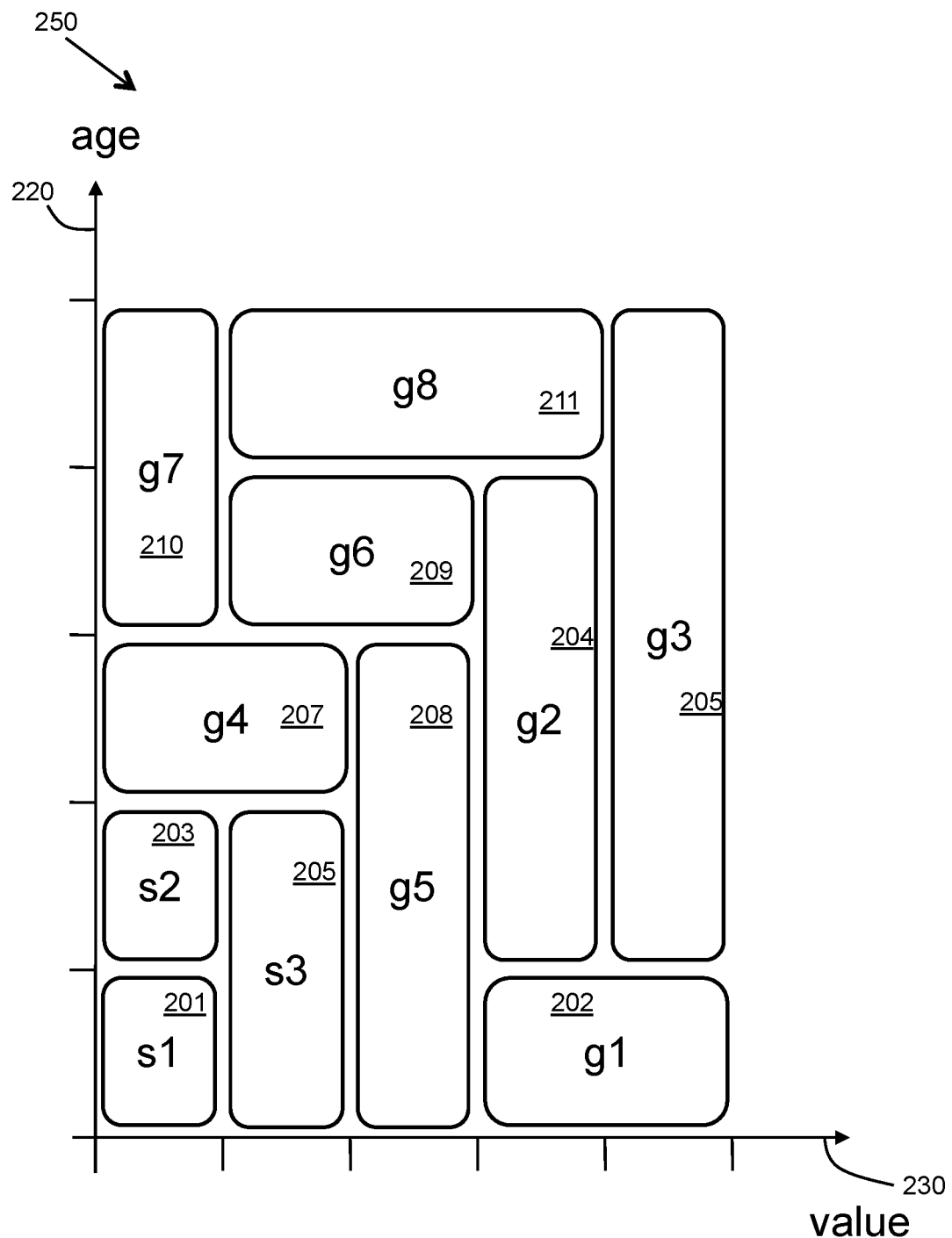

FIG. 2B shows a graph 250 of age 220 against value 230 and depicts the cases treated by each rule 201-211 of FIG. 2A in the two-dimensional case space in form of rectangular blocks. This figure shows that the rules do not overlap, but complement each other in a way that permits a simplification of the rule set. The eleven specific rules 201-211 can be transformed into three most-general rules without changing the decisions made for the cases.

Figure 2C:
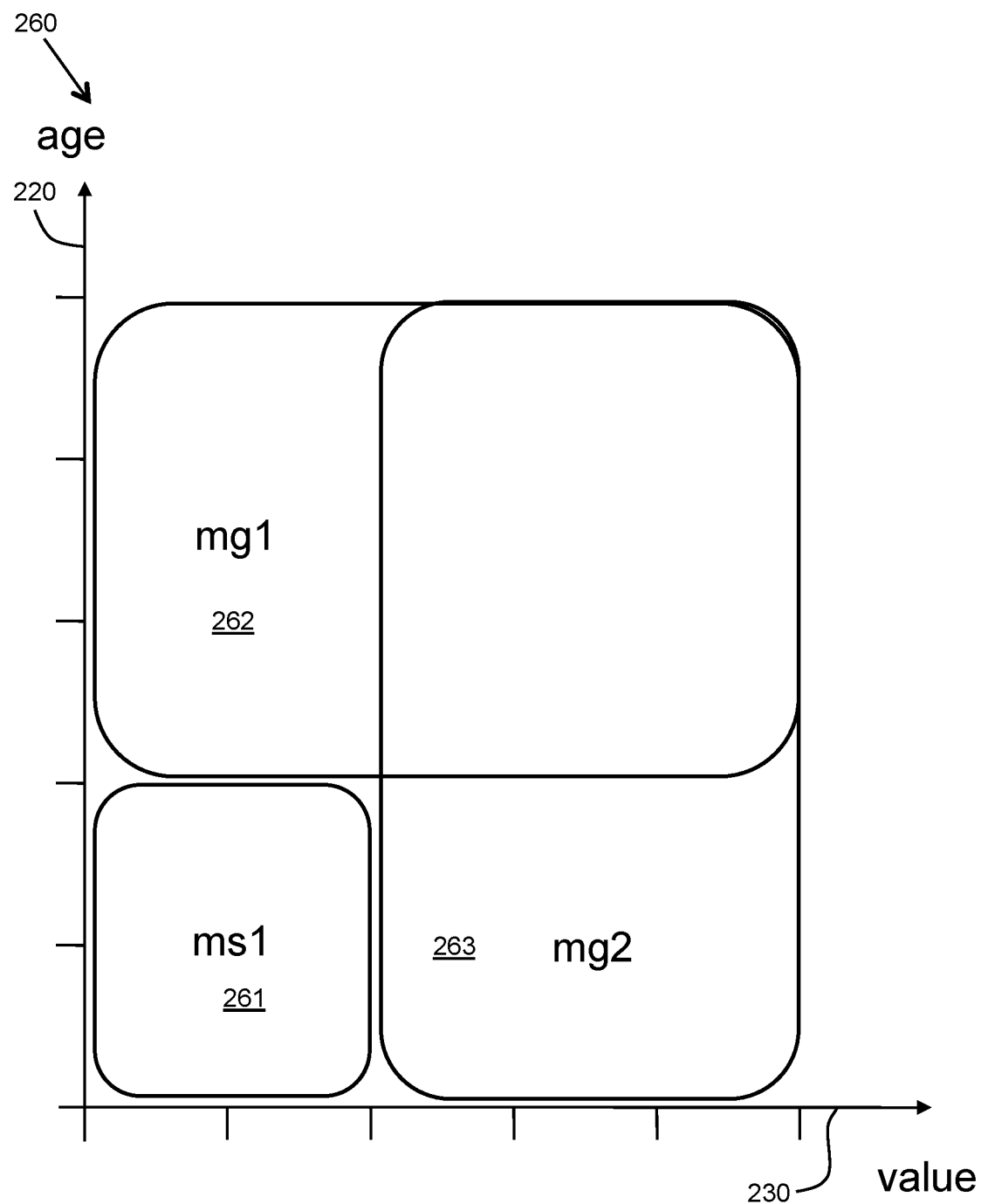

FIG. 2C shows a graph 260 of age 220 against value 230 and depicts the cases treated by the most general rules ms1 261, mg1 262, and mg2 263 as rectangular blocks in the case space.

FIG. 2D shows a decision table 270 of the most-general rules ms1 261, mg1 262, and mg2 263.

FIGS. 2B and 2C show that the rule generalization does not correspond to a simple pairwise merging of rules. Indeed, some of the original rules contribute to several of the resulting rules. For example, some of the cases treated by rule g2 204 are treated by the resulting rule mg2 263 and some other cases treated by rule g2 204 are also treated by the resulting rule mg1 262. Hence, the regions covered by the resulting rules are obtained by dividing and merging the regions of the original rules. This means that the generalization process corresponds to a complete reconstruction of the rules. The disclosed method achieves this reconstruction for an arbitrary number of dimensions. It is thus able to handle combinatorial case spaces for which it is no longer possible to draw the rectangular regions covered by the rules. A two-dimensional space nevertheless is sufficient to understand the operations of the method.

Figure 3:
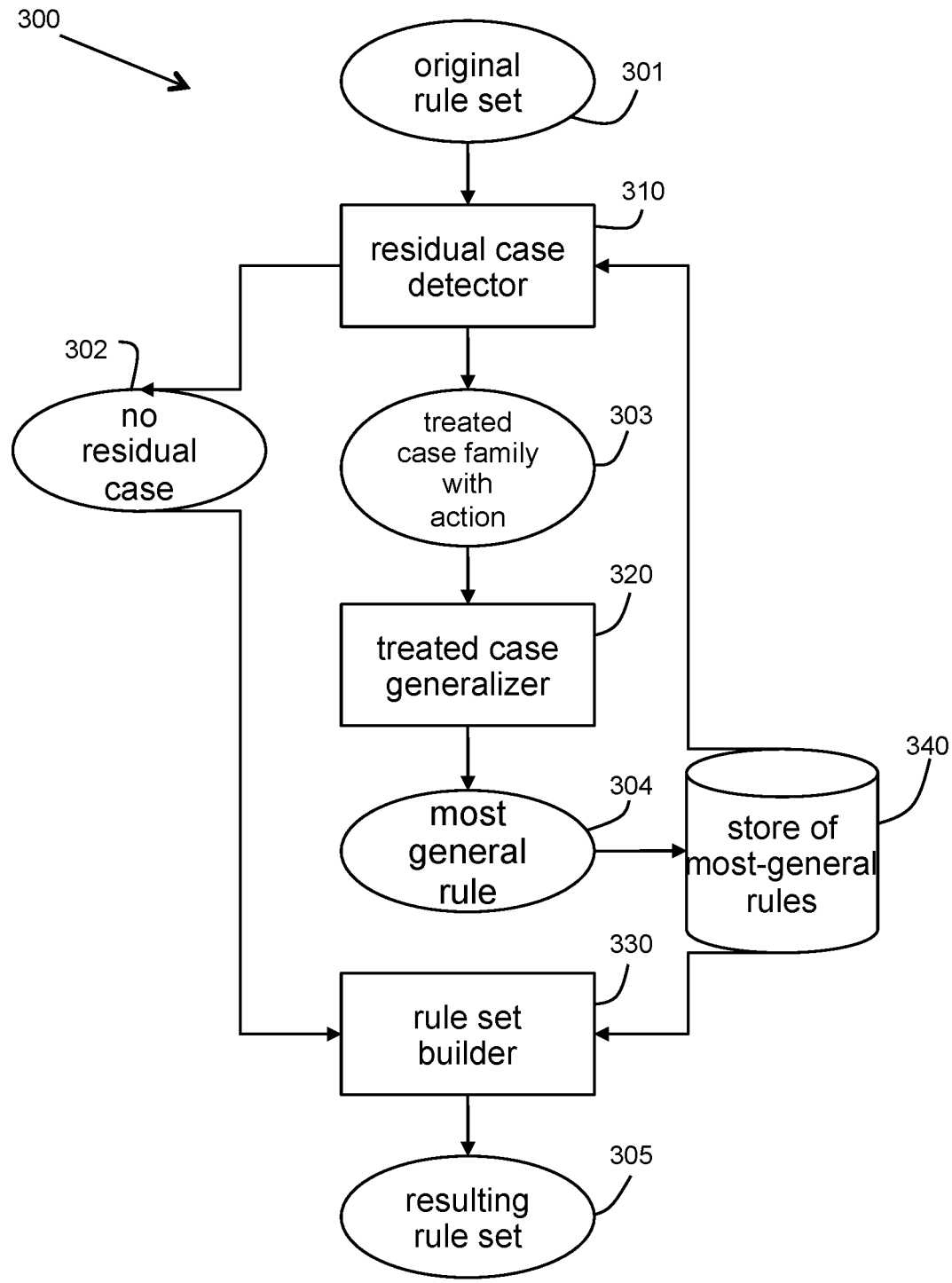
FIG. 3 is a block diagram showing system components and data flow of an example embodiment of a system and method in accordance with the present invention.

FIG. 3 shows a block diagram of an example embodiment of the described system 300 with data-flow of the disclosed method for synthesizing original rules into most-general rules. The system components are shown as rectangular blocks and the data-flow is shown as oval shapes.

Software routines for aspects of the described method are used with the input and output of those routines provided. Data-flow diagrams show the software routines as components with inputs and outputs. The diagram shows how those components are connected together and how information is passed from one component to the other one. It is a hardware-oriented way to describe a software system and, in principle, parts of it could be implemented by dedicated hardware as well. The data-flow diagrams define how information flows through the system and thus explains the steps in which this information is processed. It constrains the ordering of those steps, but does not fix this ordering.

Given a set of original rules 301, the system 300 iteratively constructs a resulting rule set. In each iteration, the method synthesizes a most-general or generalized rule 304 and adds it to a store of resulting rules 340. This most-general rule 304 treats at least one of the residual cases that are treated by the original rules 301, but not by the resulting rules that have been added to the store 340 in previous iterations. Furthermore, the most-general rule conforms to the original rule set 301 as it applies only actions to cases that are also applied by the original rules to those cases.

In order to find this most-general rule 304, the system proceeds in two steps. In the first step, a residual case detector 310 is provided with the original rule set 301 and the resulting rules in the store 340. This residual case detector 310 builds a compact description of the residual cases and their actions in form of logical constraints. The residual case detector 310 employs constraint-solving techniques to find a solution of those logical constraints and extracts a case and its action from it. It then transforms this treated case into a family of treated cases 303 for this action. This family of treated cases 303 is described in terms of the logical tests of a target rule language.

If the residual case detector 310 has computed such a family of treated cases 303 and their action, it passes them to a treated case generalizer 320. This component explores several candidate subsets of those logical tests in order to identify a subset of relevant tests for the considered action. The generalizer 320 first orders the logical tests in decreasing order of generality. It then inspects one logical test after the other in the inverse ordering and removes the logical test from the candidate set if it is irrelevant for the considered action. A logical test is relevant for the considered action if its removal from a candidate set would make the family of treated cases described by the reduced candidate set too large. This means that the enlarged family includes a case that is not treated by the original rule set 301 or the original rule set 301 does not apply the considered action to this case, but some other action. However, if the removal of a logical test does not include such a non-conforming case into the family then the logical test is irrelevant and can be removed. Once the treated-case generalizer 320 has identified all relevant logical tests, it is able to build a most-general rule 304 for the considered action and the relevant logical tests. The resulting most-general rule 304 is added to the store 340.

This rule generation is repeated until the residual case detector 310 no longer detects any residual case 302 as the original rule set 301 has completely been reconstructed in terms of resulting rules. The residual case detector 310 passes this information to a rule set builder 330, which uses the contents of the store 340 of resulting rules to build the resulting rule set 305.

Each iteration except the final one thus adds a most-general rule to the store of resulting rules and thus reduces the set of residual cases. In the example given in relation to FIGS. 2A to 2D, the system needs four iterations to synthesize the three most-general rules ms1, mg1, and mg2 for the example rule set.

Figure 4A:
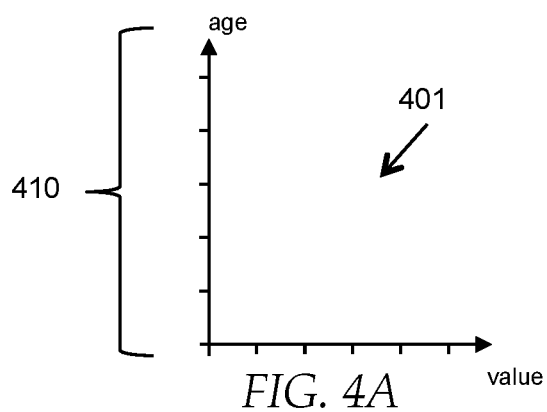
FIGS. 4A to 4H are graphs illustrating the processing of rules in an example embodiment of a method in accordance with the present invention.
Figure 4B:
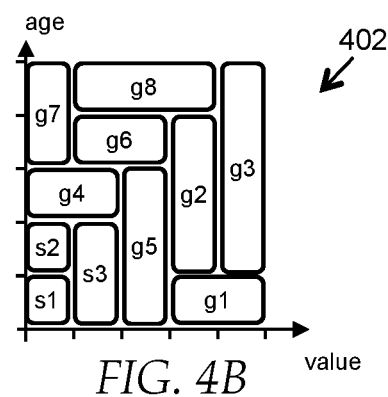
Figure 4C:
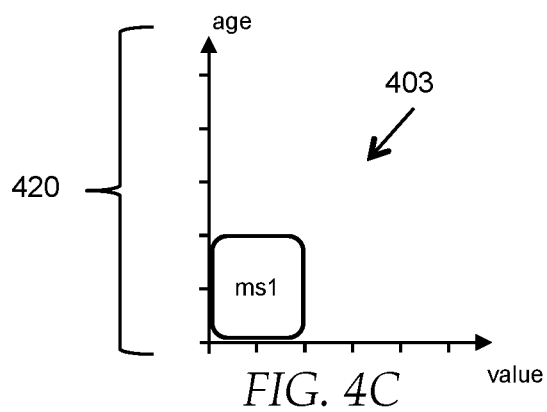
Figure 4D:
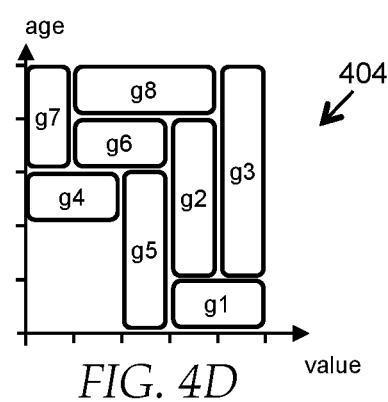
Figure 4E:
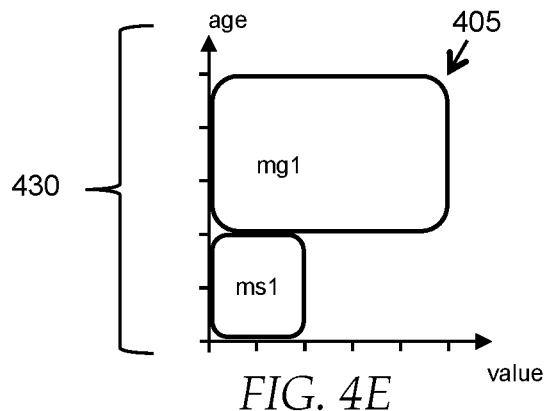
Figure 4F:
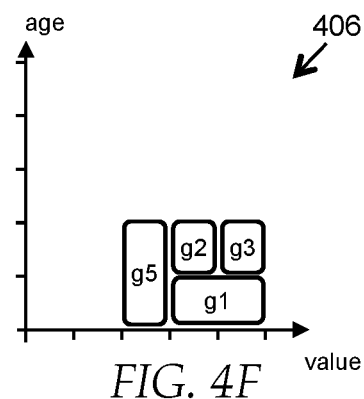
Figure 4G:
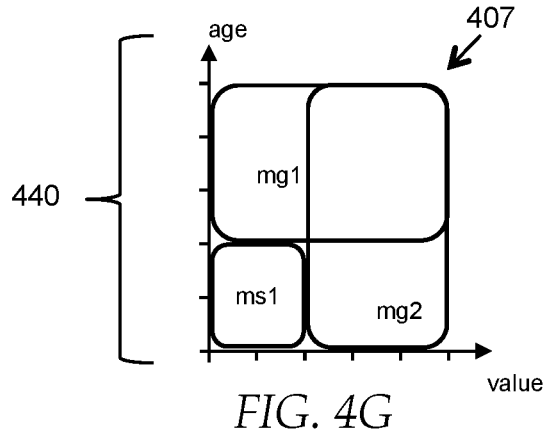
Figure 4H:
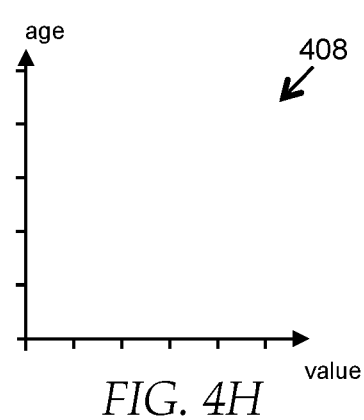

FIGS. 4A to 4H depict graphs of age versus value showing the resulting rule sets 401, 403, 405, 407 and the residual rule set 402, 404, 406, 408 of each iteration in the case space. FIGS. 4A and 4B show the resulting rule set 401 and the residual rule set 402 of the first iteration 410. FIGS. 4C and 4D show the resulting rule set 403 and the residual rule set 404 of the second iteration 420. FIGS. 4E and 4F show the resulting rule set 405 and the residual rule set 406 of the third iteration 430. FIGS. 4G and 411 show the resulting rule set 407 and the residual rule set 408 of the fourth iteration 440.

In the first iteration 410, there is no resulting rule, meaning that all the cases treated by the original rules are residual cases. As result of the first iteration 410, the system synthesizes the most-general rule ms1 that treats a case for which the decision Silver is made. The treated-case generalizer identifies the relevant tests for making this decision, which check whether the age is less than 20 and the value is less than 20. Using any smaller value than 20 will lead to a rule that is too specific and using any value greater than 20 will include a case that has decision Gold in the original rule set. As a consequence, the following rule ms1 is most-general and therefore added to the store of the resulting rules:

action rule ms1:
if the age of the customer is less than 20 and
the value of the customer is less than 20
then set the category of the customer to Silver.

In the second iteration 420, the cases treated by this resulting rule are depicted in the FIG. 4C and they are removed from FIG. 4D. FIG. 4D of the second iteration 420 thus shows the residual cases obtained after adding resulting rule ms1. The system now generates a new most-general rule that treats at least one of those residual cases. For example, this may be the residual case concerning customers of age 30 who bought items for a value of 10. Those customers receive a Gold category. The treated-case generalizer will again identify the relevant tests. If the age were smaller than 20, then a case with a Silver decision would be included. Furthermore, the age cannot exceed 50 since the original rules do not treat cases for ages above 50. Similarly, the value cannot be larger than 50 since the original rules do not treat those cases. Hence, the treated-case generalizer produces the most-general rule mg1 by using these tests and the decision Gold:

action rule mg1:
if the age of the customer is at least 20 and
the age of the customer is less than 50 and
the value of the customer is less than 50
then set the category of the customer to Gold.

As rule mg1 is added to the store of resulting rules when finishing the second iteration, FIG. 4E shows the cases treated by the rules ms1 and mg1. Those cases are removed from the residual cases in FIG. 4F of the third iteration 430. This reduces the regions covered by some of the rules such as g2, g3, and g5.

The residual-case detector is still able to find a residual case. For example, it may compute a case concerning customers of age 10 who bought items for a value of 30. The treated-case generalizer then identifies critical tests for this residual case. The value cannot be smaller than 20 since this would include a case with decision Silver. Furthermore, the value cannot be larger than 50 since the original rules do not treat those cases. And the age may not exceed 50 since the original rules do not treat those cases. As the resulting rules should be as general as possible, the treated-case generalizer ensures that all cases treated by a resulting rule are also treated by the original rules and that the resulting rule is making the same decision as the original rules for those cases. However, the resulting rule may treat residual cases that are already treated by other resulting rules. This overlap between resulting rules is non-problematic since those resulting rules are applying the same decision. Overlaps between rules of same decision (or action) are indeed a consequence of having most-general rules. In the example, the treated-case generalizer thus creates a most-general rule mg2, which overlaps with most-general rule mg1:

action rule mg2:
if the age of the customer is less than 50 and
the value of the customer is at least 20 and
the value of the customer is less than 50
then set the category of the customer to Gold.

Adding rule mg2 to the store of resulting rules closes the third iteration 430. The resulting rules in the fourth iteration 440 then cover all the cases treated by the original rules as depicted in FIG. 4G of the fourth iteration 440. As a consequence, there is no residual case left any more as shown by FIG. 411 of the fourth iteration 440. The residual-case detector is no longer able to compute a residual case and it informs the rule set builder of this fact. This component builds a resulting rule set by using the resulting rules in the store.

The two main components, namely the residual-case detector and the treated-case generalizer will now be described in more detail.

Figure 5A:
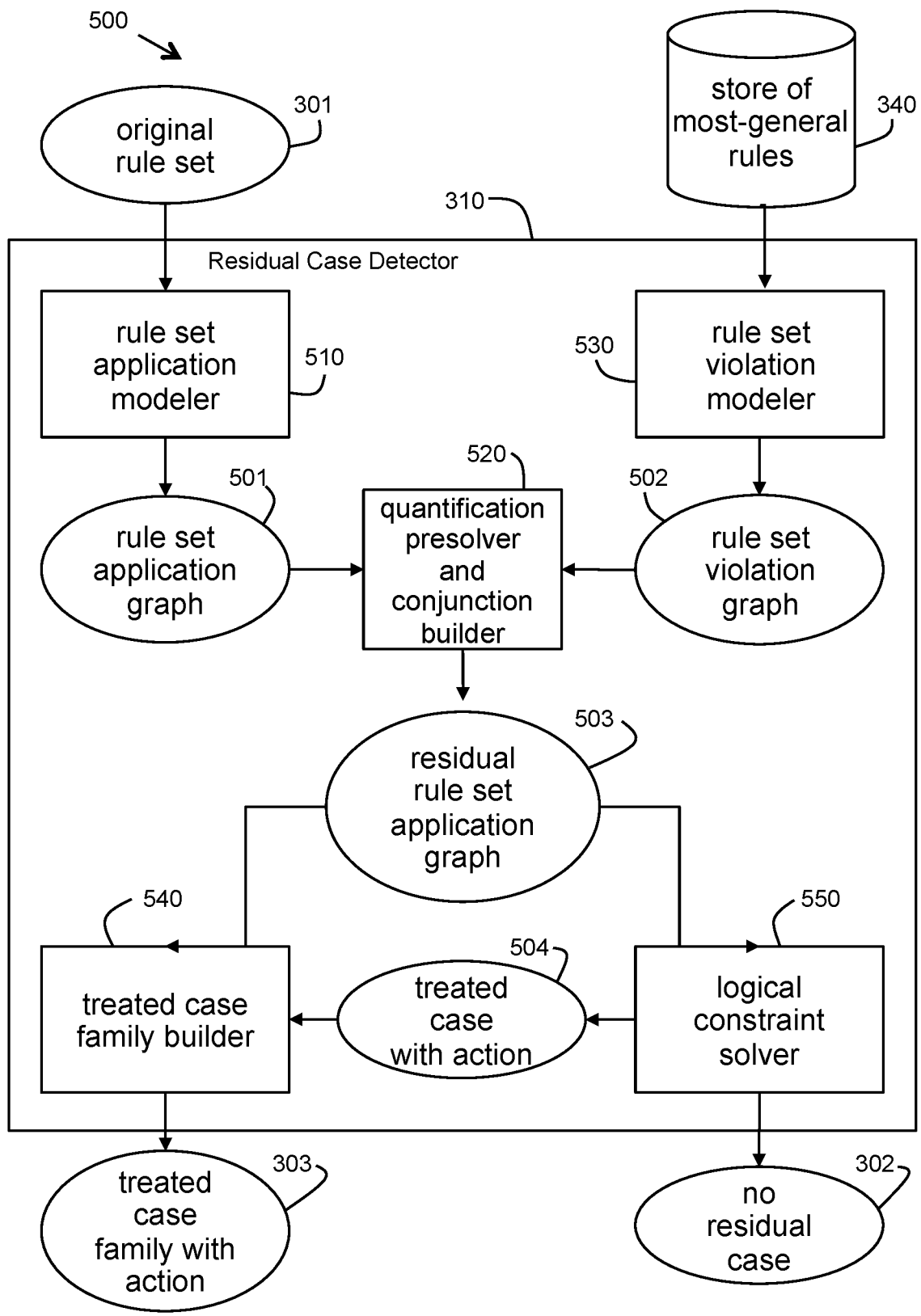
FIG. 5A is a block diagram showing system components and data flow of an aspect of an example embodiment of a system and method in accordance with the present invention.

FIG. 5A shows a block diagram 500 of an example embodiment of the aspect of the residual-case detector 310 as shown in FIG. 3 with data-flow. The system components are shown as rectangular blocks and the data-flow is shown as oval shapes.

The residual-case detector 310 is supplied with a set of original rules 301 and a store of most-general rules 340. If there is a residual case treated by the original rules, but not by the resulting rules, the residual-case detector 310 computes such a case and transforms it into a family of similar cases 303, which is returned as result. Otherwise, the residual-case detector 310 informs about the fact that there is no residual case 302.

Figure 5B:
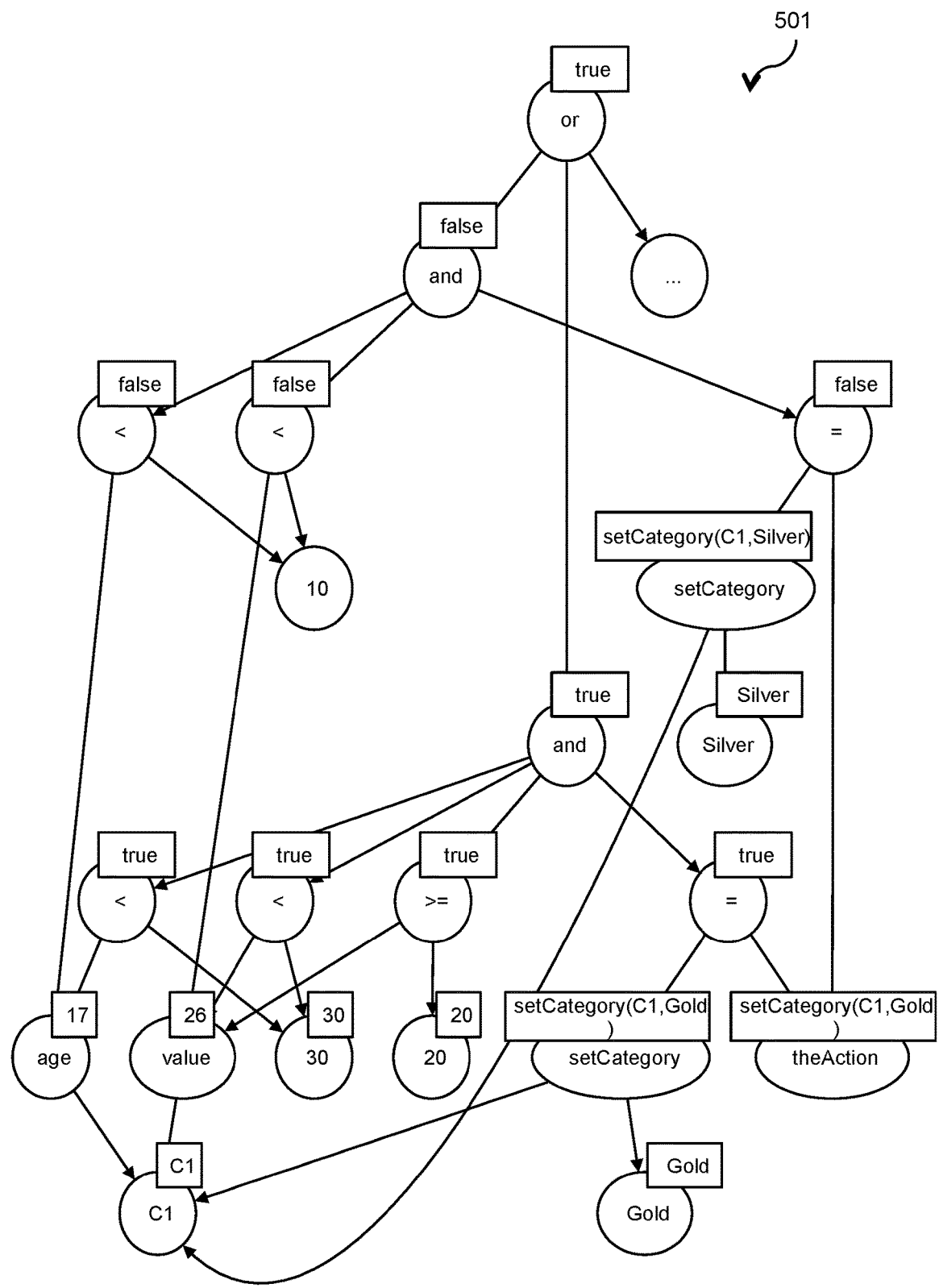
FIG. 5B shows an example rule set application graph in accordance with an aspect of the present invention.

In a first phase, the residual-case detector 310 builds a compact description of the residual cases in form of logical constraints. It uses a rule set application modeler 510 to build a description of the treated cases of the original rule set 301 and their actions. The resulting description is a constraint graph, namely a rule set application graph 501 for the original rules. An example part of a rule set application graph 501 is shown at FIG. 5B for rules S1 and G5. The illustrated graph has labels showing the rules.

Furthermore, the residual-case detector 310 uses a rule set violation modeler 530 to build a description of cases and their actions that do not correspond to the application of a resulting rule. Either such a case is not treated by any of the resulting rules or its action is different to the actions obtained by applying the resulting rules. Again this description has the form of a constraint graph, namely a rule set violation graph 502 for the resulting rules.

A quantification pre-solver and conjunction builder 520 replaces logical variables occurring in the rule set violation graph 502 by objects occurring in the rule set application graph 501. The result is a residual rule instances violation graph. The conjunction builder combines the rule set application graph 501 for the original rules and the rule instances violation graph into a single constraint graph that represents the residual cases and their actions.

This residual rule set application graph 503 is passed to a logical constraint solver 550. This constraint solver seeks a labeling of graph nodes that respects the constraints represented by those nodes and that labels the root node of the graph by "true". The logical constraint solver 550 may uses any of the constraint solving techniques as known in the literature including search and inference techniques. If the solver does not find such a labeling, no residual case 302 exists and the residual-case detector 310 stops its operations, while informing other components about this. If the logical constraint solver 550 finds a labeling, then it extracts a description of a treated case 504 and its action from this labeling. This treated case 504 and action is passed to a treated-case family builder 540. This component examines all logical tests occurring in the residual rule set application graph 503. If a logical test is satisfied by the treated case, then the family builder 540 adds this test to the description of the family. If a test is violated by the treated case, then the treated case satisfies the negation of the test. The family builder 540 therefore adds the negated test to the family description. Once all tests have been examined in this way, the family of treated cases and the action 303 are returned as result.

The operations of the residual-case detector are now described with respect to the third iteration of the example shown in FIGS. 4E and 4F.

The rule set application modeler proceeds as described in US patent application 2013/0085977 "Minimizing Rule Sets in a Rule Management System". It recursively traverses the conditions of the rules in the original rule set and maps each visited sub-expression to a graph node. It guarantees a unique representation, i.e. two occurrences of the same sub-expression are mapped to the same graph node. It maps primitive expressions such as the numeric values 10, 20, 30, 40, 50, the symbolic values Silver, Gold, Platinum, as well as the objects matched by the rules to leaf nodes. The rule set application graph states that there is some instance of one of the original rules that has been applied. Hence, there exist objects that are matched by one of the original rules. Those objects can be represented by Skolem-constants of adequate type. For example, if a rule matched an object of type customer, a single Skolem-constant "Customer1" (or "C1" for short) of type Customer will be introduced. If some other rule matches three costumer objects, two further Skolem-constants "Customer2" and "Customer3" of type Customer will be introduced. In order to keep the number of objects small, the Skolem-constants for the different rules are canonically named by type and number. Each Skolem-constant will be represented by a single leaf node in the rule set application graph.

The rule set application modeler maps composed expressions such as arithmetic operations, comparisons, accesses to attributes of objects to inner graph nodes which are labeled by an operator and which have outgoing edges to the nodes that represent their sub-expressions. The node age (C1) represents the age of customer C1 and has an outgoing edge to the node C1. Similarly, the node value(C1) represents the value of the customer C1 and has an outgoing edge to C1. The logical test "age(C1)<10" is represented by a graph node for the operator < that has outgoing edges to the nodes for age(C1) and 10. Furthermore, the modeler introduces a graph node for each original rule. This graph node represents a conjunction. It has outgoing edges to the nodes for the logical tests in the rule condition. Furthermore, it has an outgoing edge to a node that represents the application of the action of a rule. Actions are represented by graph nodes having outgoing edges to nodes that are subject of the action. For example, the action of assigning a category of Gold to a customer C1 is represented by a node for action "setCategory". This node has outgoing edges to the nodes for C1 and Gold. This action node corresponds to a logical term setCategory(C1, Gold). The rule set application modeler has to state which action is executed by which rule. As it is supposed that a single rule instance is applied, the rule set application modeler uses a constant "theAction" to refer to the action of the applied rule instance. Each rule has then a node that represents the application of the rule action by the equality of the constant "theAction" and the node for the rule action. For example, if a rule instance has the action setCategory(C1, Gold), the modeler creates a graph node for "theAction=setCategory(C1, Gold)".

Finally, the rule set application modeler creates a single root node of the rule set application graph. This root node represents the disjunction of the applications of the original rules. It thus has outgoing edges to all the nodes representing the applications of the original rules. The root node of the rule set application graph for the example represents the following logical formula:

one of the following conditions is true:

$age(C1)<10$ and $value(C1)<10$ and
theAction=setCategory(C1,Silver)

$age(C1)<10$ and $value(C1)>=30$ and $value(C1)<50$ and theAction=setCategory(C1,Gold)

$age(C1)>=10$ and $age(C1)<20$ and $value(C1)<10$ and theAction=setCategory(C1,Silver)

$age(C1)>=10$ and $age(C1)<40$ and $value(C1)>=30$ and $value(C1)<40$ and theAction=setCategory(C1,Gold)

$age(C1)>=10$ and $age(C1)<50$ and $value(C1)>=40$ and $value(C1)<50$ and theAction=setCategory(C1,Gold)

$age(C1)<20$ and $value(C1)>=10$ and $value(C1)<20$ and theAction=setCategory(C1,Silver)

$age(C1)>=20$ and $age(C1)<30$ and $value(C1)<20$ and theAction=setCategory(C1,Gold)

$age(C1)<30$ and $value(C1)>=20$ and $value(C1)<30$ and theAction=setCategory(C1,Gold)

$age(C1)>=30$ and $age(C1)<40$ and $value(C1)>=10$ and $value(C1)<30$ and theAction=setCategory(C1,Gold)

$age(C1)>=30$ and $age(C1)<50$ and $value(C1)<10$ and theAction=setCategory(C1,Gold)

$age(C1)>=40$ and $age(C1)<50$ and $value(C1)>=10$ and $value(C1)<40$ and theAction=setCategory(C1,Gold).

The rule set violation modeler proceeds similar as described in US patent application 2013/0085977 "Minimizing Rule Sets in a Rule Management System". It recursively traverses the conditions and actions of the rules in the resulting rule set and maps each visited sub-expression to a graph node. The rule set violation graph describes that each instance of each resulting rule is either non-applicable or has an action different to the applied action. The rule set violation modeler introduces logical variables for the objects matched by the resulting rules. Hence, the modeler will introduce a variable "?customer1" (or "?c1" for short) of type Customer if one of the resulting rules matches an object of type Customer. If some other rule matches two customer objects, the modeler introduces two variables "?customer1" and "?customer2". Each logical variable is represented by a unique graph node. Other sub-expressions are constructed in the same way as by the rule set application modeler. For each test occurring in a rule condition, the modeler introduces a graph node representing the negation of the test. This graph node has an outgoing edge to the node representing a test. Similarly, the modeler introduces a graph node representing the negation of the equality between the constant "theAction" and the action of a rule. For each resulting rule, the modeler further introduces a graph node that represents the rule body, i.e. the disjunction of the negated tests in the rule condition and of the negated equality of the rule set action and the action of the rule. This node has outgoing edges to the nodes representing the negated tests and the negated equality. Furthermore, the modeler constructs a node for each resulting rule, which represents the universal closure of the rule body. This closure lists all the variables occurring in the rule and describes that the rule body holds for all combination of objects that can be used to instantiate the variables. The node thus describes the violation (i.e. the non-respect) of the rule.

Finally, the rule set violation modeler creates a single root node of the rule set violation graph. This root node represents the conjunction of the violation of all resulting rules. It thus has outgoing edges to all the nodes representing the violations of the resulting rules. For the example, the root node of the rule set violation graph constructed for the resulting rules in iteration 3 represents the following logical formula:

all of the following conditions are true:

for all ?c1: not age(?c1)<20 or not value(?c1)<20 or not theAction=setCategory(?c1,Silver)

for all ?c1: not age(?c1)>=20 or not age(?c1)<50 or not value(?c1)<50 or not theAction=setCategory (?c1,Gold).

This graph is passed to a quantification pre-solver. This pre-solver eliminates the universally quantified variables and transforms the rule set violation graph into a variable-free form. For this purpose, it constructs an object domain by collecting the Skolem-constants in the rule set application graph. For example, if there is a single Skolem-constant C1, the object domain is the singleton C1. For each universal quantified constraint with variables ?x1, . . . ,?xk, the pre-solver considers each combination of k objects from the object domain and creates an instance of the constraint. When instantiating the constraint, the variables are replaced by the chosen objects. For example, the pre-solver will transform the rule set violation graph of iteration 3 into the following rule instances violation graph:

all of the following conditions are true:

not age(C1)<20 or not value(C1)<20 or not theAction=setCategory(C1,Silver)

not age(C1)>=20 or not age(C1)<50 or value(C1)< 50 or not theAction=setCategory(C1,Gold).

If the object domain contains several Skolem-constants, the instantiation process will create multiple instances of the same constraint.

The conjunction builder then constructs a graph node representing the conjunction of the rule set application graph of the original rules and the rule instances violation graph of the resulting rules. The result is a residual rule instances application graph, which is passed to a logical constraint solver.

The logical constraint solver seeks a labeling of the graph nodes such that the root node of the residual rule instances application graph is labeled by true and the operations and types of the graph nodes are respected. In FIG. 5B, such a labeling of the graph nodes is shown in rectangular boxes, which are imposed on the corresponding graph nodes. The solver uses search and inference techniques for this purpose. For example, it may label the node age (C1) by 17 and the node value(C1) by 26. Furthermore, it labels leaf nodes representing numeric and symbolic values by those values. Leaf nodes that represent Skolem-constants such as C1 are labeled by this or some other Skolem-constant. Furthermore, the leaf node representing the constant "theAction" is labeled by a logical term such as "setCategory(C1, Gold)". Other graph nodes are labeled correspondingly. For example the test "age(C1)<10" will be labeled by false since an age of 17 has been chosen. The test "value(C1)>=10" will be labeled by true since a value of 26 has been chosen. The action node representing the logical term "setCategory(C1, Gold)" will be labeled by this term. Hence, the nodes for "theAction" and "setCategory(C1, Gold)" have the same label, meaning that the node for "theAction=setCategory (C1, Gold)" will be labeled true. Furthermore, the node for "theAction=setCategory(C1, Silver)" will be labeled false. Among the different disjuncts of the rule set application graph, the following one will be labeled true:

age(C1)<30 and value(C1)>=20 and value(C1)<30 and theAction=setCategory(C1,Gold)

Furthermore, all the conjuncts of the rule instances violation graph will be labeled true since the node for "not value(C1)<20" and for "not age(C1)>=20 are labeled true:

not age(C1)<20 or not value(C1)<20 or not theAction=setCategory(C1,Silver)

not age(C1)>=20 or not age(C1)<50 or not value (C1)<50 or not theAction=setCategory(C1, Gold).

Referring to FIGS. 6A to 6D, graphs 610, 620, 630, 640 show the described rule synthesis.

Figure 6A:
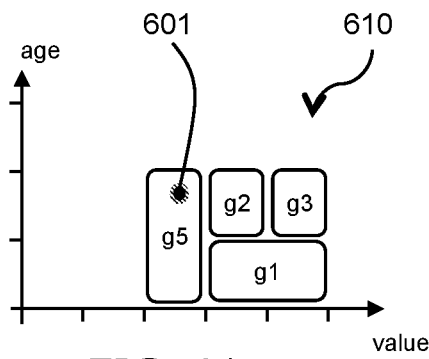
FIGS. 6A to 6D are graphs illustrating the processing of rules in an example embodiment of a method in accordance with the present invention.

As a consequence the root node of the residual rule instances application graph is labeled by true. This means that the labeling corresponds to a residual case. The FIG. 6A depicts the treated case 601 with action among the residual rules. The logical constraint solver passes the labeling to the treated-case family builder.

It may happen that the logical constraint solver runs into a time out and does not find a residual case, although one exists. In that situation, the method will not be able to reconstruct the whole rule set.

The treated-case family builder extracts the action of the residual case by taking the label of the node "theAction" which is "setCategory(C1, Gold)" in iteration 3 of the example. Furthermore, the treated-case family builder inspects each logical test in the labeled residual rule instances application graph. If a logical test such as "value (C1)>=10" is labeled true, then the test is added to the description of the treated-case family. If a logical test such as "age(C1)<10" is labeled false, the logical negation of the test, that means "age(C1)>=10", is added to the family description. This will result into the following family description:

age(C1)>=10,value(C1)>=10,value(C1)<30,value (C1)<50,age(C1)<20, age(C1)<40,value (C1)<40,age(C1)<50,value(C1)>=20,age (C1)<30.

Figure 6B:
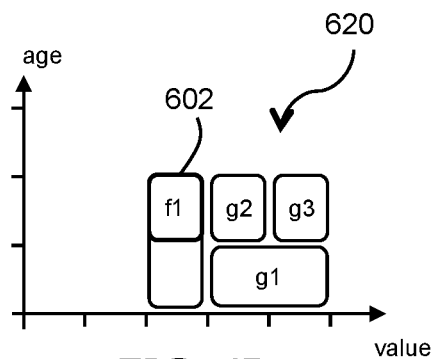

The family contains all cases that satisfy those logical tests. The FIG. 6B depicts those cases by a rectangular block f1 602 with thick lines.

Figure 6C:
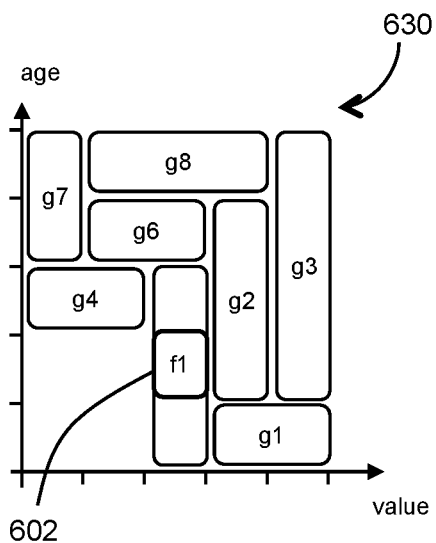
Figure 6D:
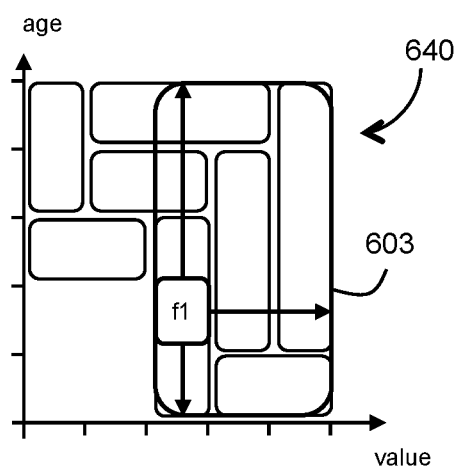

The treated-case generalizer is supplied with the treated case family and the action. It removes irrelevant tests from the family and thus enlarges the family. The enlarged family thus contains additional cases. A case may be included if there is an additional rule that is applicable to this case and that applies the action of the family to the case. FIG. 6C shows the eligible cases. FIG. 6D shows how the family f1 603 is enlarged after the removal of all irrelevant tests.

Figure 7:
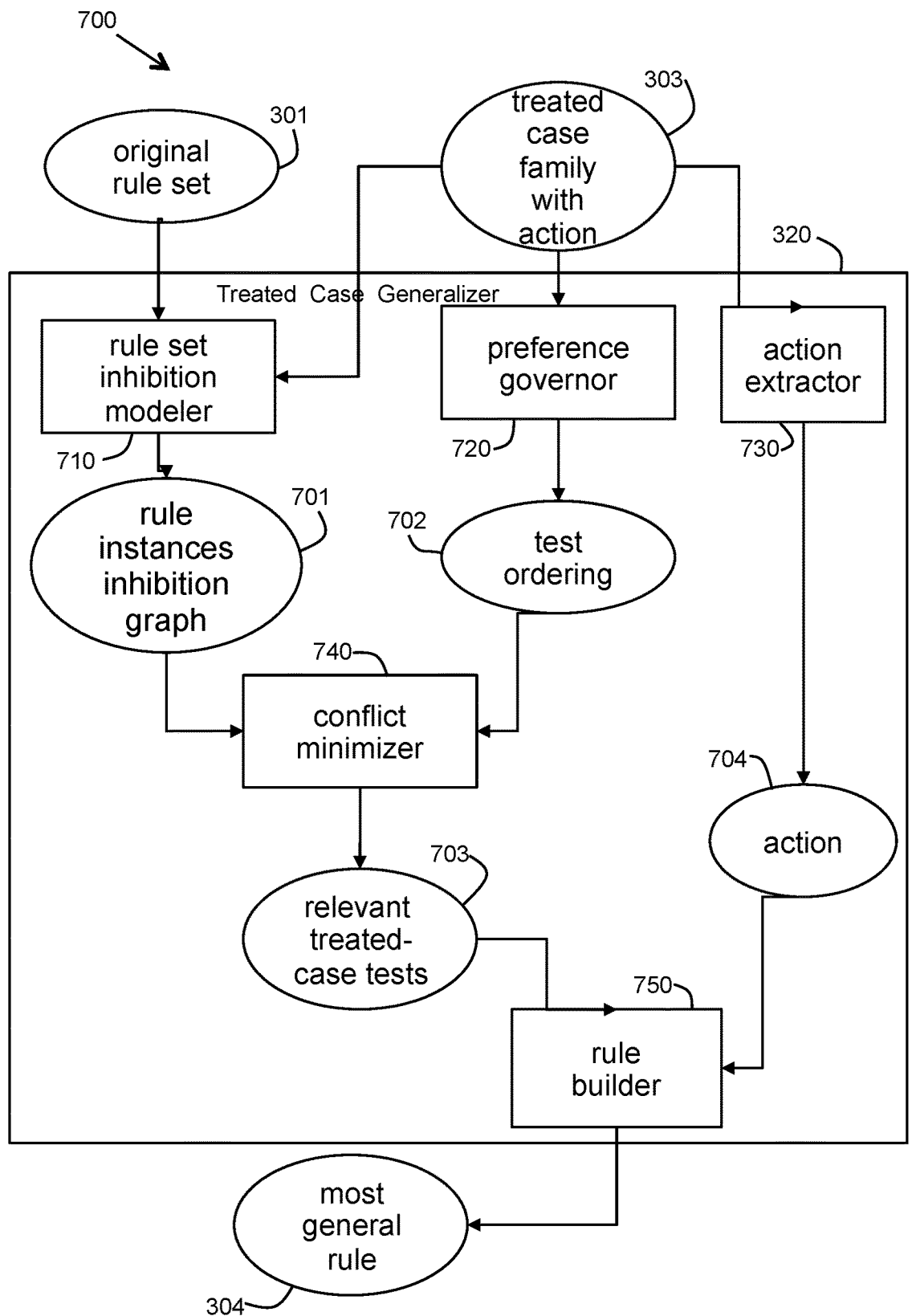
FIG. 7 is a block diagram showing system components and data flow of an aspect of an example embodiment of a system and method in accordance with the present invention.

FIG. 7 shows a block diagram 700 of an example embodiment of the aspect of the treated-case generalizer 320 as shown in FIG. 3 with data-flow. The system components are shown as rectangular blocks and the data-flow is shown as oval shapes.

The components of the treated-case generalizer 320 are illustrated for iteration 3 of the example.

The treated-case generalizer 320 employs a rule set inhibition modeler 710 to build a compact description of all the cases that are not eligible. This modeler 710 selects all the rules from the original rule set 301 that may apply the action of the treated case family 303. It then builds a rule instances inhibition graph 701 for those rules. This graph is satisfied by a case if this case makes all the selected rules inapplicable. These are exactly the cases that are not depicted the graph of FIG. 6C. The treated-case family does not overlap with those non-eligible cases. Therefore, there is not any case that satisfies both the logical tests in the family and the rules instances inhibition graph 701. Hence, the logical tests in the family are logically inconsistent and constitute a conflict set if the constraint of the rules instances inhibition graph 701 is imposed. The treated-case generalizer 320 uses a conflict minimizer 740 to compute a minimal subset of logical tests while using the rules instances inhibition graph 701 as background constraint. The conflict minimizer 740 explores different candidate subsets. The initial candidate set contains all logical tests. The conflict minimizer 740 may then remove one logical test after the other one from the candidate subset. The removal of a test leads to a new candidate subset. If the family described by this candidate subset includes a non-eligible case, then this case also satisfies the rules instances inhibition graph 701, meaning that the candidate subset is consistent under the background constraint. The conflict minimizer 740 therefore rejects such a candidate subset and restores the previous candidate subset. However, if the family of a candidate subset contains only eligible cases, then this candidate subset is inconsistent. The conflict minimizer 740 can then accept this candidate subset. Repeating this method results into a minimal set of logical tests. Removing any logical test from this minimal set would include any non-eligible case.

However, there may be many minimal subsets of logical tests that are inconsistent under the given background constraint. If most specific logical tests have been removed first from the candidate set, then the result will be a most-general family of eligible cases. However, if relevant general tests are removed before specific tests, then the result will not be a most-general family. The treated-case generalizer 320 therefore orders the logical tests by employing a preference governor 720 (see US Patent Application 2012/0158628 "Method and System for Detecting Missing Rules with Most General Conditions). The conflict minimizer 740 then respects the test ordering 702 maintained by the preference governor 720. Based on this, the conflict minimizer 740 computes a set of relevant treated-case tests 703 that describe a most-general family of eligible cases. A rule builder 750 then constructs a most-general rule 304 by using this set of tests as condition. The action 704 of the constructed rule is the action of the treated-case family 303 given as input to the treated-case generalizer 320 and extracted by an action extractor 730.

The preference governor is supplied with a set of logical tests in some arbitrary order. It may further be supplied with background constraints that limit the set of all cases to a subset of relevant cases. If no background constraint is given, each case is relevant. Otherwise, only cases satisfying the background constraints are relevant. The preference governor returns a total ordering of the given logical tests such that no logical test is ill placed in this resulting ordering. A logical test is ill placed in an ordering if all relevant cases that satisfy the conjunction of the preceding logical tests also satisfy the considered logical test and there is a relevant case that satisfies this logical test, but not the conjunction of the preceding tests. An ill-placed logical test is thus more general than the conjunction of its preceding tests.

For example, the logical test "x>=10" is ill placed in the ordering (1) "x>=20", (2) "y>=20", (3) "x>=10" as it is satisfied by more cases than the logical test "x>=20". The preference governor will reorder the tests as follows (1) "x>=10", (2) "x>=20", (3) "y>=20". In this resulting ordering, the more general test "x>=10" precedes the more specific test "x>=20", meaning that more general tests are preferred to more specific tests.

In more complex examples, a logical test may be ill placed due to the combination of several preceding tests. For example, the test "x+y>=20" is ill-placed in the ordering (1) "x>=10", (2) "y>=10", (3) "x+y>=20" since each case that satisfies both "x>=10" and "y>=10" also satisfies "x+y>=20", and there are cases such as x=25, y=5 that satisfy "x+y>=20", but violate some logical tests among "x>=10" and "y>=10". The preference governor will reorder these tests as follows (1) "x>=10", (2) "x+y >=20", (3) "y>=10". The logical test "x+y >=20" is not more general than "x>=10" as, for example, it does not include the case x=15, y=0, which satisfies "x>=10". Similarly, the logical test "y>=10" is not more general than the conjunction of "x>=10" and "x+y >=20" as it does not include the case x=25, y=5.

The preference governor constructs the resulting ordering starting from the end. In each iteration, it seeks the latest well-placed logical test in the initial ordering of the tests. It removes this well-placed logical test from the initial ordering and adds it at the beginning of the resulting ordering. This procedure is repeated until all logical tests have been moved from the initial ordering to the resulting ordering.

To find the latest well-placed test, the preference governor inspects each logical test in the initial ordering while starting from the end. This inspection consists in determining whether the logical test is entailed by the conjunction of the preceding tests. Entailment is checked by passing the preceding logical tests as well as the negation of the inspected test to a constraint solver. If the solver finds no solution, the inspected test is entailed and the preference governor continues the inspection process. Otherwise, the solver has found a solution that satisfies the preceding tests and that violates the inspected test, meaning that the inspected test is not more general than the conjunction of its preceding tests. Hence, it is well placed.

The preference governor thus establishes an ordering of logical tests that prefers more general tests to more specific ones and passes this ordering to the conflict minimizer. The conflict minimizer will then determine one relevant logical test after the other. When it detects a relevant logical test, then this logical test becomes a background constraint, thus requiring of reordering of the remaining tests. For example, the test "x>=10" is more specific than "x+y>=20" under the background constraint "y>=10". The conflict minimizer therefore requests the preference governor to reorder the logical tests when this is required by the detection of new background constraints.

Figure 8:
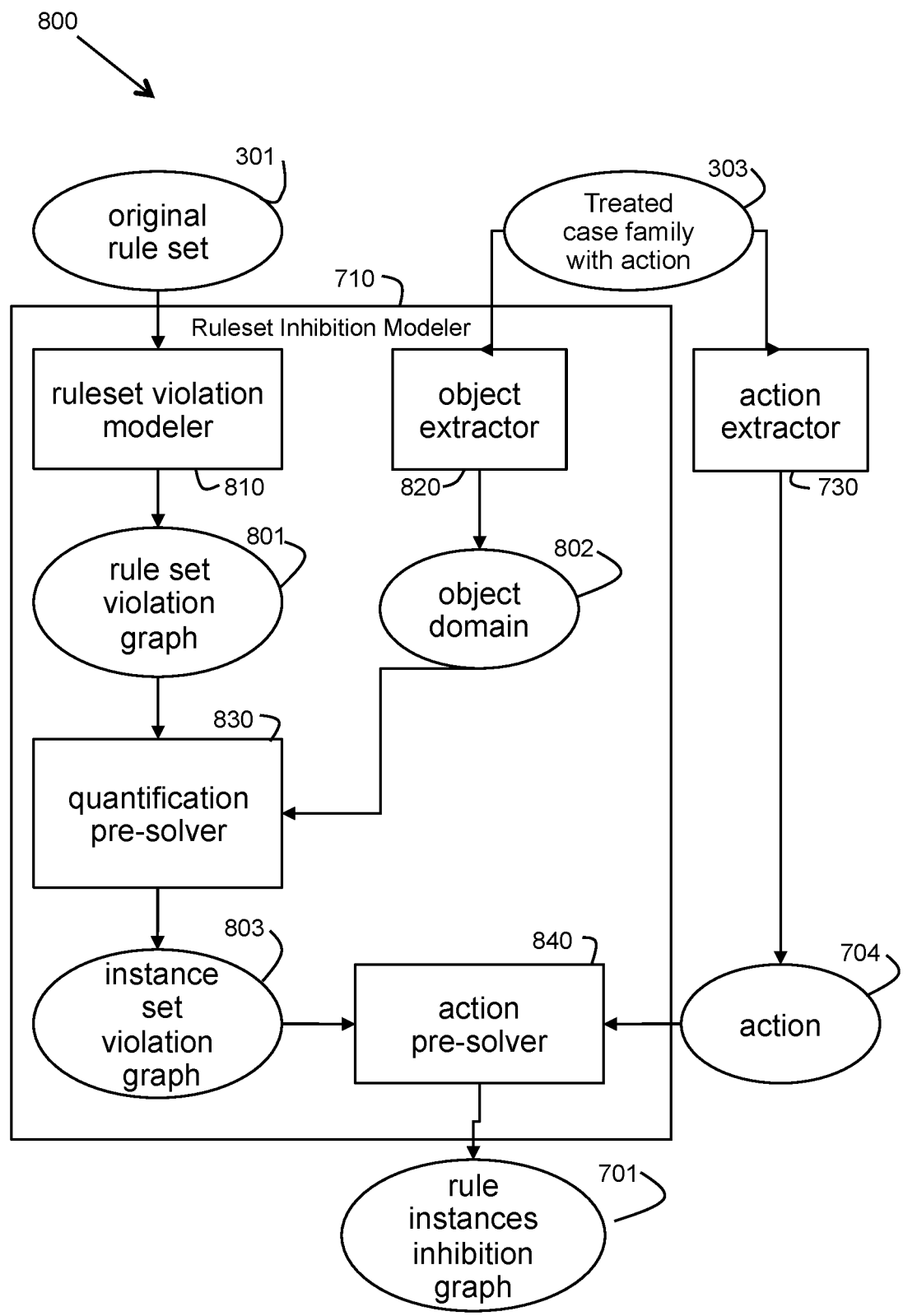
FIG. 8 is a block diagram showing system components and data flow of an aspect of an example embodiment of a system and method in accordance with the present invention.

FIG. 8 shows a block diagram 800 of an example embodiment of the aspect of the rule set inhibition modeler 710 as shown in FIG. 7 with data-flow. The system components are shown as rectangular blocks and the data-flow is shown as oval shapes.

In a first step, the rule set inhibition modeler 710 builds a rule set violation graph 801 for the original rule set 301 using a rule set violation modeler 810. It then uses an object extractor 820 to extract all objects occurring in the logical tests of the treated case family and builds an object domain 802 containing all those objects. The family computed in iteration 3 of the example contains a single object, namely the Skolem-constant C1. Hence, the constructed object domain is the singleton C1. A quantification pre-solver 830 uses this object domain 802 to instantiate all quantified constraints represented by the rule set violation graph 801. This results into an instance set violation graph 803 that represents the following constraint (for the sake of readability, a negated test such as "not age(C1)<10" has been simplified into the test "age(C1)>=10"):

all of the following conditions are true:

age(C1)>=10 or value(C1)>=10 or
theAction!=setCategory(C1,Silver)

age(C1)>=10 or value(C1)<30 or value(C1)>=50 or
theAction!=setCategory(C1,Gold)

age(C1)<10 or age(C1)>=20 or value(C1)>=10 or
theAction!=setCategory(C1,Silver)

age(C1)<10 or age(C1)>=40 or value(C1)<30 or value(C1)>=40 or theAction!=setCategory(C1, Gold)

age(C1)<10 or age(C1)>=50 or value(C1)<40 or value(C1)>=50 or theAction!=setCategory(C1, Gold)

age(C1)>=20 or value(C1)<10 or value(C1)>=20 or
theAction!=setCategory(C1,Silver)

age(C1)<20 or age(C1)>=30 or value(C1)>=20 or
theAction!=setCategory(C1,Gold)

age(C1)>=30 or value(C1)<20 or value(C1)>=30 or
theAction!=setCategory(C1,Gold)

age(C1)<30 or age(C1)>=40 or value(C1)<10 or value(C1)>=30 or theAction!=setCategory(C1, Gold)

age(C1)<30 or age(C1)>=50 or value(C1)>=10 or
theAction!=setCategory(C1,Gold)

age(C1)<40 or age(C1)>=50 or value(C1)<10 or value(C1)>=40 or theAction!=setCategory(C1, Gold).

An action pre-solver 840 imposes that the action 704 must be equal to that chosen for the given treated case family f1. As this chosen action is "setCategory(C1, Gold)", it is different to other actions such as "setCategory(C1, Silver)", meaning that tests such as "theAction !=setCategory(C1, Silver)" are necessarily true. Hence, disjunctions containing such a test are necessarily true as well and can be removed from the rule instances violation graph. Furthermore, the logical test "theAction!=setCategory(C1, Gold)" is necessarily false and can thus be removed from all disjunctions. The action pre-solver does these modifications and reduces the rule instances violation graph into a rule instances inhibition graph. The rule instances inhibition graph 701 computed in iteration 3 of the example represents the following constraint, which is satisfied by the non-eligible cases:

all of the following conditions are true:

age(C1)>=10 or value(C1)<30 or value(C1)>=50 age(C1)<10 or age(C1)>=40 or value(C1)<30 or value(C1)>=40 age(C1)<10 or age(C1)>=50 or value(C1)<40 or value(C1)>=50 age(C1)<20 or age(C1)>=30 or value(C1)>=20 age(C1)>=30 or value(C1)<20 or value(C1)>=30 age(C1)<30 or age(C1)>=40 or value(C1)<10 or value(C1)>=30 age(C1)<30 or age(C1)>=50 or value(C1)>=10 age(C1)<40 or age(C1)>=50 or value(C1)<10 or value(C1)>=40.

There is not any case that satisfies this conjunction and all the tests that characterize the treated case family f1:

age(C1)>=10, value(C1)>=10, value(C1)<30, value(C1)<50,age(C1)<20, age(C1)<40, value(C1)<40, age(C1)<50, value(C1)>=20, age(C1)<30.

Indeed, those tests violate the fifth conjunct "age(C1)>=30 or value(C1)<20 or value(C1)>=30". A conflict minimizer such as QuickXplain [Junker, 2004] is then able to determine a minimal inconsistent subset of the tests if the rule instances inhibition graph 701 is passed as background constraint. In general there are multiple minimal inconsistent subsets, but the ordering of the tests permits the definition of a unique most preferred inconsistent subset. Tests that come earlier in the ordering are preferred to tests coming later in the ordering. As a consequence, the conflict minimizer starts removing tests in the inverse ordering. Given the ordering above, this results in a most-preferred minimal inconsistent subset of the tests:

value(C1)<30, age(C1)<20, value(C1)>=20.

The family described by this set of tests contains more cases than the family f1, but is not a most-general family of eligible cases. The reason is that more specific tests such as "value(C1)<30" precede more general tests such as "value(C1)<50" in the given ordering, meaning that those more specific tests have been considered more important by the conflict minimizer. This family of cases could be used to build the following resulting rule, but this rule is not a most-general rule. Indeed it is even more specific than the original rule g5:

if the age of the customer is less than 20 and
    the value of the customer is at least 20 and
    the value of the customer is less than 30
then set the category of the customer to Gold.

In order to guarantee that the resulting rules are at least as general as the original rules, the system needs to be able to produce most-general rules and to keep the more general logical tests when identifying relevant tests. The treated-case generalizer 320 therefore employs a preference governor 720. This preference governor 720 imposes that more general tests precede more specific tests in the ordering. For example, the preference governor may order the logical tests as follows:

age($C1$)>=10, value($C1$)>=10, value($C1$)<50, value($C1$)<40, value($C1$)<30, age($C1$)<50, age($C1$)<40, age($C1$)<30, age($C1$)<20, value($C1$)>=20.

Given this ordering, the conflict minimizer then is able to find the following set of logical tests, which describes a most-general family of eligible test.

value($C1$)<50, age($C1$)<50, value($C1$)>=20.

The rule builder 750 then uses this set of tests as well as the action "setCategory(C1, Gold)" and builds a most-general rule for them. In order to do this, it replaces the Skolem-constant C1 by a rule variable. The result is action rule mg2.

action rule mg2:
if the age of the customer is less than 50 and
the value of the customer is at least 20 and
the value of the customer is less than 50
then set the category of the customer to Gold.

As this rule is built from relevant tests only, it may have a smaller number of tests than the specific rules that it replaces. This reduction of the number of tests in a rule facilitates rule management and may improve the performance of rule execution.

It may happen that the conflict minimizer runs into a time out. In this situation, it will not be able to remove all irrelevant tests. It then returns a set of tests, which describes a family that only contains eligible cases, but which may not be a most-general family of eligible cases. The resulting rule build for this case is then still a valid rule, albeit not a most-general one.

Furthermore, the resulting rule set constructed by the rule synthesis method may contain redundant rules. Whereas a newly generated resulting rule is not made redundant by the previously generated resulting rules, the inverse may happen. Therefore, a rule set minimizer as described in US patent application 2013/0085977 "Minimizing Rule Sets in a Rule Management System" can be applied to the resulting rule set in order to eliminate redundant resulting rules.

The whole rule synthesis method does not only work for condition-action rules, but also for logical implications and for default rules. Those rules do not apply an action, but infer a logical conclusion. The method will then use this logical conclusion instead of equalities between the constant "theAction" and a logical term representing an action.

The method as explained above uses a target rule language where rule conditions are conjunctions of logical tests of the original rules and the negations of those tests. Variants of target languages are possible. For example, a test stating an equality of an attribute and a numerical value can be replaced by two logical tests that impose that value as upper and as lower bound for the attribute. Thus, a test such as "the age of the customer is 20" can be replaced by two tests "the age of the customer is at least 20" and "the age of the customer is at most 20" in the target language. This modified target language permits the generation of more general rules than the direct target language.

The described method and system address rule compression in a broad and exhaustive way. It opens the door to refactoring of rule sets and will allow business users to fight the natural tendency of rule fragmentation and rule specialization. It brings rules back into a most-general form and thus permits business users to avoid an uncontrolled growth of their rule sets.

A similar problem exists in access control rules for firewalls. So although this document is couch in terms of business rules, other rule application may also apply.

The example described herein shows that the rule manipulation is sufficiently difficult that even an expert in rule authoring will not find the three most-general rules without drawing the two-dimensional graphs that are shown for illustration. However, drawing such graphs will no longer be possible if there are more than two or three dimensions. Realistic decision tables have tens or hundreds of columns. The described method is able to treat those cases as well. The reason is that it uses explanation techniques for reducing the dimensionality to the relevant dimensions.

An example implementation has been carried out with eleven rules and with three added dimensions. For each dimension, the number of rules was duplicated by adding some logical test over this dimension and the negation of this test. The implemented system efficiently processes a resulting set of eighty-eight rules and finds the three most-general rules in approximately five seconds.

The described method and system leverages advanced problem solving techniques such as constraint solving and consistency-based explanation techniques. It is well known in constraint solving how to set up the data structures to represent the constraints and how to apply a constraint solver such that it solves those constraints. Given this, it is sufficient to explain which constraints are built by the system in order to achieve the desired effects. The constraints may be represented in the form of graphs (made of nodes and arcs).

Some organizations may want to keep their rules specialized by geographic region or by other criteria. But even in that case, the described method and system will bring value as it allows the compression of the rule set for the purpose of rule execution, thus making the execution faster.

Figure 9:
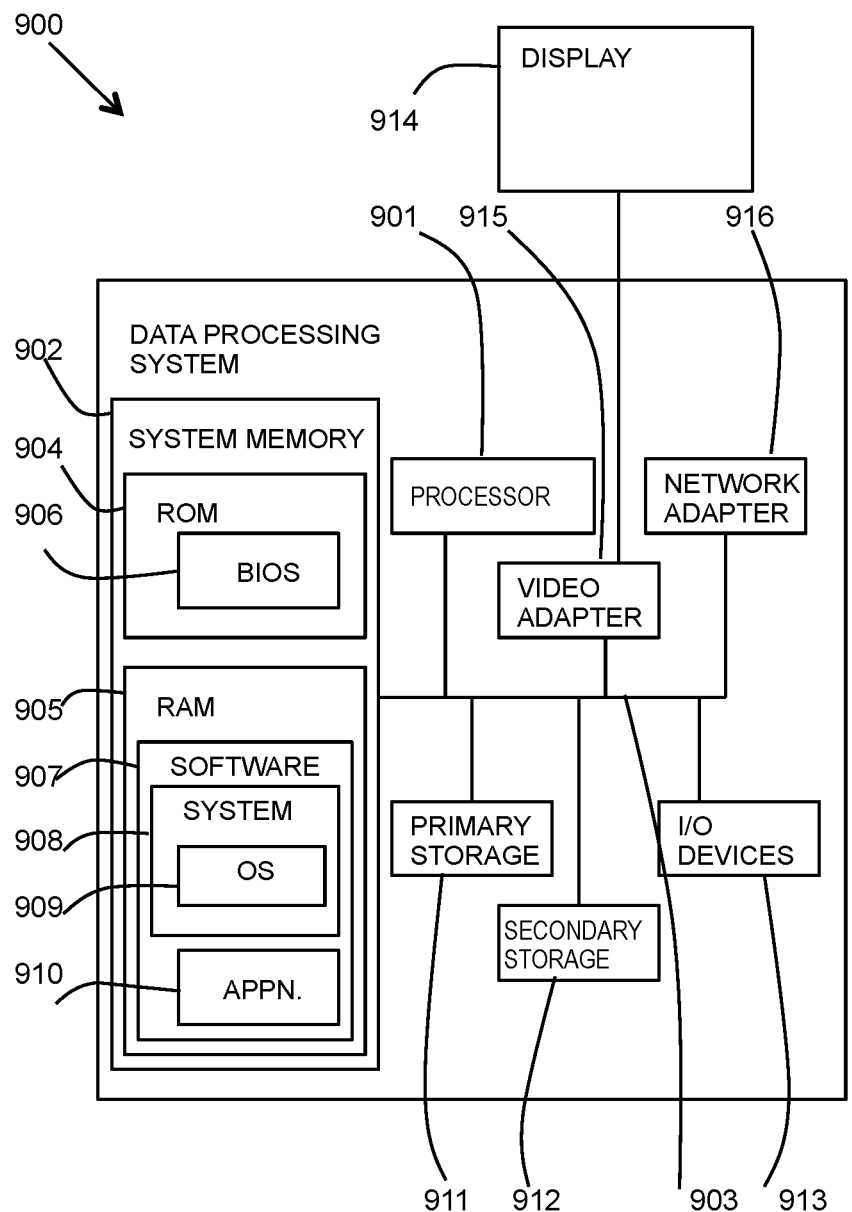
FIG. 9 is a block diagram of an embodiment of a computer system in which the present invention may be implemented.

Referring to FIG. 9, an exemplary system for implementing aspects of the invention includes a data processing system 900 suitable for storing and/or executing program code including at least one processor 901 coupled directly or indirectly to memory elements through a bus system 903. The memory elements may include local memory employed during actual execution of the program code, bulk storage, and cache memories which provide temporary storage of at least some program code in order to reduce the number of times code must be retrieved from bulk storage during execution.

The memory elements may include system memory 902 in the form of read only memory (ROM) 904 and random access memory (RAM) 905. A basic input/output system (BIOS) 906 may be stored in ROM 904. System software 907 may be stored in RAM 905 including operating system software 908. Software applications 910 may also be stored in RAM 905.

The system 900 may also include a primary storage means 911 such as a magnetic hard disk drive and secondary storage means 912 such as a magnetic disc drive and an optical disc drive. The drives and their associated computer-readable media provide non-volatile storage of computer-executable instructions, data structures, program modules and other data for the system 900. Software applications may be stored on the primary and secondary storage means 911, 912 as well as the system memory 902.

The computing system 900 may operate in a networked environment using logical connections to one or more remote computers via a network adapter 916.

Input/output devices 913 may be coupled to the system either directly or through intervening I/O controllers. A user may enter commands and information into the system 900 through input devices such as a keyboard, pointing device, or other input devices (for example, microphone, joy stick, game pad, satellite dish, scanner, or the like). Output devices may include speakers, printers, etc. A display device 914 is also connected to system bus 903 via an interface, such as video adapter 915.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD. Improvements and modifications can be made to the foregoing without departing from the scope of the present invention.

What is claimed is:

1. A method performed by a computer for transforming an original set of rules into a resulting set of generalized rules in a rule management system, the method comprising the steps of:
    the computer providing an original set of rules stored in a data structure in memory for transforming into a resulting set of rules;
    the computer performing an automated processing of the original set of rules by:
        the computer building a compact description of one or more rules in the original set of rules and one or more actions of the one or more rules in the form of one or more logical constraints and solving constraints to find a solution that represents a case and an applied action;
        the computer building a family of cases by taking a selection from among at least one of one or more logical tests of the one or more rules that are satisfied by the solution and one or more negations of the one or more logical tests of the one or more rules that are satisfied by the solution;
        the computer generalizing the family of cases by removing one or more specific logical tests from among the selection that do not limit the applicability of the applied action, to identify a most-general rule; and
        the computer adding the most-general rule to the resulting set of rules;
    the computer iterating the automated processing at least one or more times, wherein for each iteration building the compact description of the one or more rules in the original set of rules and the one or more actions excludes any rules in the original set of rules which are addressed by the resulting set of rules; and
    the computer replacing the original set of rules stored in the data structure in the memory with an equivalent set of generalized rules set in the resulting set of rules for automated application by the rule management system, wherein the size of the resulting set of rules in the memory is smaller than the original set of rules, the original set of rules comprising at least two rules that are not possible to merge into a single rule because the at least two rules comprise a plurality of attributes that impose different tests on more than one of the plurality of attributes, the resulting set of rules comprising at least one most-general rule that is a logical equivalent of the at least two rules.

2. The method according to claim 1, wherein the computer generalizing the family of cases further comprises:
    the computer establishing an ordering of the one or more logical tests ordered according from characterization as general tests to more specific tests; and
    the computer applying a conflict minimizer for computing a selection of relevant tests according to the ordering from among the one or more logical tests by:
    the computer inspecting each of the one or more logical tests in an inverse of the ordering; and
    the computer, for each of the one or more logical tests inspected, removing a particular logical test from the family of cases if the particular logical test is not relevant for the applied action, where the particular logical test is relevant for the applied action if removal of the particular logical test would yield a particular case that is not treated by the original set of rules or the original set of rules does not apply the applied action to the particular case.

3. The method according to claim 1, wherein the computer generalizing the family of cases by removing one or more specific logical tests from among the selection that do not limit the applicability of the applied action, to identify the most-general rule, further comprises:
    the computer generalizing the family of cases by removing one or more specific logical tests from among the selection that do not limit the applicability of the applied action, to identify the most-general rule, wherein the most-general rule treats at least one case of the family of cases that is treated by the original set of rules, but not yet treated by the resulting set of rules, wherein the most-general rule conforms to the original set of rules as the most-general rules applies only a selection of actions to one or more particular cases that are also applied by the original set of rules to those one or more particular cases.

4. The method according to claim 1, wherein the computer building the family of cases further comprises:
    the computer building a residual rule set application graph of one or more residual rules that are treated in the original set of rules but not yet treated in the resulting set of rules, the residual rule set application graph comprising one or more solutions which are represented by one or more graph labels that respect one or more semantics of a plurality of nodes and that label a root note as true, each graph labeling corresponding to a separate case of one or more objects representing a selection of the one or more residual rules, a separate applied action by each case identified by each graph labeling of a separate action node;

the computer identifying the solving constraints to find the solution in the residual rule set application graph and extracting the case and the applied action for the solution in the residual rule set application graph; and the computer building the family of cases by taking the selection from among the at least one of one or more logical tests that are satisfied by the extracted case and the one or more negations of the one or more logical tests that are satisfied by the extracted case.

5. The method according to claim 1, wherein the computer generalizing the family of cases further comprises:

the computer generating the family of cases into the most-general rule using one or more explanation-based consistency techniques to identify a selection of one or more relevant logical tests from among the one or more logical tests in the compact description to generalize the family of cases into the most-general rule.

6. The method according to claim 1, further comprising:

the computer removing one or more irrelevant logical tests from among the one or more logical tests, from the original set of rules.

7. The method according to claim 1, the computer replacing the original set of rules stored in the data structure in the memory with an equivalent set of generalized rules set in the resulting set of rules for automated application by the rule management system, wherein the size of the resulting set of rules is smaller than the original set of rules further comprising:

the computer customizing the resulting set of rules in a target rule language in which rule conditions of the resulting set of rules are conjunctions of logical tests of the original set of rules and negations of the logical tests of the original set of rules.

8. A computer system for transforming an original set of rules into a resulting set of generalized rules in a rule management system, the computer system comprising:

one or more processors, one or more computer-readable memories and one or more computer-readable, tangible storage devices;

an original set of rules stored in a data structure on the one or more computer-readable memories for transforming into a resulting set of rules;

program instructions, stored on at least one of the one or more storage devices for execution by at least one of the one or more processors via at least one of the one or more memories, to automate rule processing, the program instructions to automate rule processing further comprising:

a residual case detector operative for building a compact description of one or more rules in the original set of rules and one or more actions of the one or more rules in the form of one or more logical constraints and solving constraints to find a solution that represents a case and an applied action and building a family of cases by taking a selection from among at least one of one or more logical tests that are satisfied by the solution and one or more negations of one or more logical tests that are satisfied by the solution;

a treated case generalizer operative for generalizing the family of cases by removing one or more specific logical tests from among the selection that do not limit the applicability of the one or more actions, resulting in a most-general rule; and a controller operative for adding the most-general rule to the resulting set of rules; and program instructions, stored on at least one of the one or more storage devices for execution by at least one of the one or more processors via at least one of the one or more memories, to iterate the automated rule processing at least one or more times wherein for each iteration the residual case detector is further operative to build the compact description of the one or more rules in the original set of rules and the one or more actions excludes any rules in the original set of rules which are addressed by the resulting set of rules;

program instructions, stored on at least one of the one or more storage devices for execution by at least one of the one or more processors via at least one of the one or more memories, to replace the original set of rules stored in the data structure with an equivalent set of generalized rules set in the resulting set of rules for automated application by the rule management system, wherein the size of the resulting set of rules on the one or more computer-readable memories is smaller than the original set of rules, the original set of rules comprising at least two rules that are not possible to merge into a single rule because the at least two rules comprise a plurality of attributes that impose different tests on more than one of the plurality of attributes, the resulting set of rules comprising at least one most-general rule that is a logical equivalent of the at least two rules.

9. The computer system according to claim 8, further comprising:

the treated case generalizer operative to establish an ordering of the one or more logical tests ordered from characterization as more general tests to more specific tests; and the treated case generalizer operative to pass this ordering to a conflict minimizer for computing a selection of relevant tests from among the one or more logical tests by:

inspecting each of the one or more logical tests in an inverse of the ordering; and for each of the one or more logical tests inspected, removing a particular logical test from the family of cases if the particular logical test is not relevant for the applied action, where the particular logical test is relevant for the applied action if removal of the particular logical test would yield a particular case that is not treated by the original set of rules or the original set of rules does not apply the applied action to the particular case.

10. The computer system according to claim 8, wherein the residual case detector further comprises:

a rule set application modeler operative to build a residual rule set application graph of one or more residual rules that are treated in the original set of rules but not yet treated in the resulting set of rules, the residual rule set application graph comprising one or more solutions which are represented by one or more graph labels that respect one or more semantics of a plurality of nodes and that label a root note as true, each graph labeling corresponding to a separate case of one or more objects representing a selection of the one or more residual rules, a separate applied action by each case identified by each graph labeling of a separate action node;

a logical constraint solver operative to identify the solving constraints to find the solution in the residual rule set application graph and extract the case and the applied action for the solution in the residual rule set application graph; and a treated case family builder operative to build the family of cases by taking the selection from among the at least one of one or more logical tests that are satisfied by the extracted case and the one or more negations of the one or more logical tests that are satisfied by the extracted case.

11. The computer system according to claim 8, further comprising:
the treated case generalizer operative to use one or more explanation-based consistency techniques to identify a selection of one or more relevant logical tests from among the one or more logical tests in the compact description to generalize the family of cases into the most-general rule.

12. The computer system according to claim 8, further comprising:
program instructions, stored on at least one of the one or more storage devices for execution by at least one of the one or more processors via at least one of the one or more memories, to remove one or more irrelevant logical tests from among the one or more logical tests, from the original set of rules.

13. The computer system according to claim 8, further comprising:
program instructions, stored on at least one of the one or more storage devices for execution by at least one of the one or more processors via at least one of the one or more memories, to customize the resulting set of rules in a target rule language in which rule conditions of the resulting set of rules are conjunctions of logical tests of the original set of rules and negations of the logical tests of the original set of rules.

14. A computer program product for transforming an original set of rules into a resulting set of generalized rules in a rule management system, the computer program product comprising a non-transitory computer readable storage medium having program instructions embodied therewith, the program instructions readable by a processor to cause the processor to:
access, by the processor, an original set of rules stored in a data structure in memory for transforming into a resulting set of rules;
perform an automated processing of the original set of rules by the processor by:
building, by the processor, a compact description of one or more rules in the original set of rules and one or more actions of the one or more rules in the form of one or more logical constraints and solving constraints to find a solution that represents a case and an applied action;
building, by the processor, a family of cases by taking a selection from among at least one of one or more logical tests of the one or more rules that are satisfied by the solution and one or more negations of the one or more logical tests of the one or more rules that are satisfied by the solution;
generalizing, by the processor, the family of cases by removing one or more specific logical tests from among the selection that do not limit the applicability of the applied action, to identify a most-general rule; and adding, by the processor, the most-general rule to the resulting set of rules;
iterate, by the processor, the automated processing at least one or more times, wherein for each iteration building the compact description of the one or more rules in the original set of rules and the one or more actions excludes any rules in the original set of rules which are addressed by the resulting set of rules; and
replace, by the processor, the original set of rules stored in the data structure in the memory with an equivalent set of generalized rules set in the resulting set of rules for automated application by the rule management system, wherein the size of the resulting set of rules in the memory is smaller than the original set of rules, the original set of rules comprising at least two rules that are not possible to merge into a single rule because the at least two rules comprise a plurality of attributes that impose different tests on more than one of the plurality of attributes, the resulting set of rules comprising at least one most-general rule that is a logical equivalent of the at least two rules.

15. The computer program product according to claim 14, further comprising program instructions readable by a processor to cause the processor to:
establish, by the processor, an ordering of the one or more logical tests ordered according from characterization as general tests to more specific tests; and
apply, by the processor, a conflict minimizer for computing a selection of relevant tests according to the ordering from among the one or more logical tests by:
inspect, by the processor, each of the one or more logical tests in an inverse of the ordering; and
for each of the one or more logical tests inspected, remove, by the processor, a particular logical test from the family of cases if the particular logical test is not relevant for the applied action, where the particular logical test is relevant for the applied action if removal of the particular logical test would yield a particular case that is not treated by the original set of rules or the original set of rules does not apply the applied action to the particular case.

16. The computer program product according to claim 14, further comprising program instructions readable by a processor to cause the processor to:
generalize, by the processor, the family of cases by removing one or more specific logical tests from among the selection that do not limit the applicability of the applied action, to identify the most-general rule, wherein the most-general rule treats at least one case of the family of cases that is treated by the original set of rules, but not yet treated by the resulting set of rules, wherein the most-general rule conforms to the original set of rules as the most-general rules applies only a selection of actions to one or more particular cases that are also applied by the original set of rules to those one or more particular cases.

17. The computer program product according to claim 14, further comprising program instructions readable by a processor to cause the processor to:
build, by the processor, a residual rule set application graph of one or more residual rules that are treated in the original set of rules but not yet treated in the resulting set of rules, the residual rule set application graph comprising one or more solutions which are represented by one or more graph labels that respect one or more semantics of a plurality of nodes and that label a root note as true, each graph labeling corresponding to a separate case of one or more objects representing a selection of the one or more residual rules, a separate applied action by each case identified by each graph labeling of a separate action node;

identify, by the processor, the solving constraints to find the solution in the residual rule set application graph and extracting the case and the applied action for the solution in the residual rule set application graph; and build, by the processor, the family of cases by taking the selection from among the at least one of one or more logical tests that are satisfied by the extracted case and the one or more negations of the one or more logical tests that are satisfied by the extracted case.

18. The computer program product according to claim 14, further comprising program instructions readable by a processor to cause the processor to:

generate, by the processor, the family of cases into the most-general rule using one or more explanation-based consistency techniques to identify a selection of one or more relevant logical tests from among the one or more logical tests in the compact description to generalize the family of cases into the most-general rule.

19. The computer program product according to claim 14, further comprising program instructions readable by a processor to cause the processor to:

remove, by the processor, one or more irrelevant logical tests from among the one or more logical tests, from the original set of rules.

20. The computer program product according to claim 14, further comprising program instructions readable by a processor to cause the processor to:

customize, by the processor, the resulting set of rules in a target rule language in which rule conditions of the resulting set of rules are conjunctions of logical tests of the original set of rules and negations of the logical tests of the original set of rules.

* * * * *